(12) United States Patent
Chang et al.

(10) Patent No.: US 8,724,617 B2
(45) Date of Patent: May 13, 2014

(54) UPLINK SYNCHRONIZATION PROCESSING METHOD, USER EQUIPMENT, AND BASE STATION

(75) Inventors: Junren Chang, Beijing (CN); Yajuan Li, Beijing (CN); Weiwei Song, Beijing (CN); Liangliang Zhang, Beijing (CN); Wei Quan, Beijing (CN); Zhongbin Qin, Warsaw (PL); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 195 days.

(21) Appl. No.: 13/421,665

(22) Filed: Mar. 15, 2012

(65) Prior Publication Data

US 2012/0170570 A1  Jul. 5, 2012

Related U.S. Application Data

(63) Continuation of application No. PCT/CN2009/073943, filed on Sep. 15, 2009.

(51) Int. Cl.
*H04J 3/06* (2006.01)

(52) U.S. Cl.
USPC ......................................................... 370/350

(58) Field of Classification Search
CPC combination set(s) only.
See application file for complete search history.

(56) References Cited

U.S. PATENT DOCUMENTS

| 8,520,768 | B2 * | 8/2013 | Han et al. | 375/295 |
|---|---|---|---|---|
| 2007/0000967 | A1 | 1/2007 | Suh | |
| 2007/0230394 | A1 | 10/2007 | Wang et al. | |
| 2007/0254656 | A1 | 11/2007 | Dalsgaard | |
| 2008/0060249 | A1 | 3/2008 | Stillwell | |
| 2008/0119979 | A1 | 5/2008 | Impson et al. | |
| 2008/0305822 | A1 | 12/2008 | Li et al. | |
| 2010/0329188 | A1 * | 12/2010 | Jen | 370/328 |
| 2011/0070845 | A1 * | 3/2011 | Chen et al. | 455/91 |
| 2011/0194523 | A1 * | 8/2011 | Chung et al. | 370/329 |
| 2012/0009963 | A1 * | 1/2012 | Kim et al. | 455/509 |
| 2012/0033603 | A1 * | 2/2012 | Seo et al. | 370/312 |
| 2014/0016506 | A1 * | 1/2014 | Gauvreau et al. | 370/254 |

FOREIGN PATENT DOCUMENTS

| CN | 1189946 A | 8/1998 |
|---|---|---|
| CN | 101277145 A | 10/2008 |
| CN | 101409700 A | 4/2009 |
| CN | 101646234 A | 2/2010 |
| CN | 101932052 A | 12/2010 |
| WO | WO 2010/149035 A1 | 12/2010 |

OTHER PUBLICATIONS

Supplementary European Search Report dated Sep. 27, 2012 in connection with European Patent Application No. EP 09 84 9362.

(Continued)

*Primary Examiner* — Clemence Han

(57) ABSTRACT

An uplink synchronization processing method, a User Equipment (UE), and a base station are provided. The method includes: receiving a component carrier (CC) uplink synchronization indication message sent by a base station, where the uplink synchronization indication message carries identification information of one or multiple newly configured CCs; sending synchronization signaling to the base station when knowing that the uplink synchronization needs to be executed on all or a part of the one or multiple newly configured CCs corresponding to the identification information; and receiving a time advanced (TA) adjusting message that is sent by the base station according to the synchronization signaling, and applying a TA value carried in the TA adjusting message to the CC on which the uplink synchronization needs to be executed.

17 Claims, 7 Drawing Sheets

(56) References Cited

OTHER PUBLICATIONS

Huawei, "Issues in carrier aggregation", 3GPP TSG WG1 Meeting #bis, Jun. 29-Jul. 3, 2009, 6 pages.

LG Electronics Inc., "Text Proposal to TS 36.321 on Max No of TX for RACH MSG 3", 3GPP TSG-RAN WG2 #62, May 5-9, 2008, 8 pages.

Texas Instruments, "On RACH Procedure for Asymmetric Carrier Aggregation", 3GPP TSG RAN WG1 #56bis, Mar. 23-27, 2009, 4 pages.

Alcatel-Lucent, "LS Reply to RAN2 on Carrier Aggregation", 3GPP TSG-RAN WG1 #58, Aug. 24-28, 2009, 2 pages.

Communication dated Jul. 5, 2013 in connection with European Patent Application No. 13 17 0077.

Written Opinion of the International Searching Authority dated Jun. 24, 2010 in connection with International Patent Application No. PCT/CN2009/073943.

Translation of Office Action dated Feb. 5, 2013 in connection with Chinese Patent Application No. 200980147162.5.

International Search Report dated Jun. 24, 2010 in connection with International Patent Application No. PCT/CN2009/073943.

\* cited by examiner

US 8,724,617 B2

UPLINK SYNCHRONIZATION PROCESSING METHOD, USER EQUIPMENT, AND BASE STATION

CROSS-REFERENCE TO RELATED APPLICATIONS

This application is a continuation of International Application No. PCT/CN2009/073943, filed on Sep. 15, 2009, which is hereby incorporated by reference in its entirety.

TECHNICAL FIELD

The present invention relates to the field of communications, and in particular, to an uplink synchronization processing method, a User Equipment (UE), and a base station.

BACKGROUND

A long term evolved-advanced (Long Term Evolved-Advanced, LTE-A) system needs to support bandwidth being wider than that of an LTE system, so that multiple carriers may be aggregated. Carrier aggregation means that multiple component carriers (Component Carriers, CCs) are converged to a carrier with bandwidth being wider than that of the LTE system, to support a high-speed data rate.

In the prior art, when a user equipment (User Equipment, UE) uses multiple CCs, under certain scenes, a time advanced (Time Advanced, TA value) of each CC is different. For example, when a base station configures different CCs on different repeaters (Repeaters), or the CCs of different frequencies pass through different scattering paths, TA values of the different CCs are different. Further, for example, when the UE communicates with two non-collaborated access points by using two different CCs, the TA values of the two CCs are different.

Therefore, when the TA values of the multiple CCs used by the UE are different, if the base station needs to configure a new CC for the UE, or one of multiple CCs currently used by the UE needs to be replaced by newly configured CCs, how the UE can achieve uplink synchronization with the newly configured CCs becomes an urgent problem to be solved.

SUMMARY

Embodiments of the present invention provide an uplink synchronization processing method, a UE, and a base station, to solve a problem how the UE can achieve uplink synchronization with newly configured CCs.

In order to achieve the objective, an embodiment of the present invention provides an uplink synchronization processing method, which includes:

receiving an uplink synchronization indication message sent by a base station, where the uplink synchronization indication message carries identification information of one or multiple newly configured CCs;

sending synchronization signaling to the base station when knowing that the uplink synchronization needs to be executed on all or a part of the one or multiple newly configured CCs corresponding to the identification information; and receiving a TA adjusting message that is sent by the base station according to the synchronization signaling, and applying a TA value carried in the TA adjusting message to the CC on which the uplink synchronization needs to be executed.

An embodiment of the present invention provides an uplink synchronization processing method, which includes:

sending an uplink synchronization indication message to a UE, where the uplink synchronization indication message carries identification information of one or multiple newly configured CCs;

receiving synchronization signaling sent by the UE; and sending a TA adjusting message to the UE according to the synchronization signaling, to instruct the UE to apply a TA value carried in the TA adjusting message to the CC on which the uplink synchronization needs to be executed.

Correspondingly, an embodiment of the present invention provides a UE, which includes:

a first receiving module, configured to receive an uplink synchronization indication message sent by a base station, where the uplink synchronization indication message carries identification information of one or multiple newly configured CCs;

a first sending module, configured to send synchronization signaling to the base station when knowing that the uplink synchronization needs to be executed on all or a part of the one or multiple newly configured CCs corresponding to the identification information; and a first processing module, configured to apply a TA value carried in a TA adjusting message to the CC on which the uplink synchronization needs to be executed, after the first receiving module receives the TA adjusting message that is sent by the base station according to the synchronization signaling.

An embodiment of the present invention provides a base station, which includes:

a second sending module, configured to send an uplink synchronization indication message to a UE, where the uplink synchronization indication message carries identification information of one or multiple newly configured CCs; and a second receiving module, configured to receive synchronization signaling sent by the UE, where the second sending module is further configured to send a TA adjusting message to the UE according to the synchronization signaling, to instruct the UE to apply a TA value carried in the TA adjusting message to the CC on which the uplink synchronization needs to be executed.

In the embodiments of the present invention, when a base station needs to configure a new CC for a UE, or one or multiple CCs currently used by the UE need to be replaced by newly configured CCs, the UE may achieve uplink synchronization with the newly configured CCs by using the obtained TA value. Further, during the procedure, the UE is triggered to execute the uplink synchronization only through an uplink synchronization indication message, to save downlink radio resources, and when the UE needs to execute the uplink synchronization, the UE may send a dedicated preamble to the base station, to obtain a TA value required to be used on the newly configured CC from the base station, thereby improving an uplink synchronization speed.

An embodiment of the present invention further provides an uplink synchronization processing method, which includes:

receiving an uplink synchronization indication message sent by a base station, where the uplink synchronization indication message carries identification information of one or multiple newly configured CCs; and executing uplink synchronization on the one or multiple newly configured CCs, if knowing, according to the identification information of the CCs, that the one or multiple newly configured CCs and a currently used CC do not belong to the same CC group, where the CC group is formed by the one or multiple CCs sharing the same TA value.

An embodiment of the present invention further provides an uplink synchronization processing method, which includes:

sending CC group information to a UE in a broadcasting manner or through dedicated signaling, where the CC group information is used to instruct CCs in the same CC group to share a TA value; and sending an uplink synchronization indication message to the UE, where the uplink synchronization indication message carries identification information of one or multiple newly configured CCs, wherein the identification information is for the UE performing uplink synchronization on the one or multiple newly configured CCs if the UE knows the one or multiple newly configured CCs and a currently used CC do not belong to the same CC group according to the identification information of the one or multiple newly configured CCs.

Accordingly, an embodiment of the present invention provides a UE, which includes:

a third receiving module, configured to receive an uplink synchronization indication message sent by a base station, where the uplink synchronization indication message carries identification information of one or multiple newly configured CCs; and a third processing module, configured to execute uplink synchronization on the one or multiple newly configured CCs when knowing, according to the identification information of the CCs, that the one or multiple newly configured CCs and a currently used CC do not belong to the same CC group, where the CC group is formed by one or multiple CCs sharing the same TA value.

An embodiment of the present invention provides a base station, which includes:

a third sending module, configured to send CC group information to a UE in a broadcasting manner or through dedicated signaling, where the CC group information is used to instruct CCs in the same CC group to share a TA value; and a fourth sending module, configured to send an uplink synchronization indication message to the UE, where the uplink synchronization indication message carries identification information of one or multiple newly configured CCs, wherein the identification information is for the UE performing uplink synchronization on the one or multiple newly configured CCs if the UE knows the one or multiple newly configured CCs and a currently used CC do not belong to the same CC group according to the identification information of the one or multiple newly configured CCs.

In the embodiments of the present invention, when a CC group exists, a UE may know, according to CC group information and newly configured identification information, whether newly configured CCs belong to a certain CC group. When the newly configured CCs belong to a certain CC group, uplink synchronization is realized by directly using a TA corresponding to the CC group, when the newly configured CCs do not belong to a certain CC group, an uplink synchronization operation may be initiated to a base station, to obtain a TA value used on the newly configured CC from the base station. Therefore, when the base station needs to configure a new CC for the UE, or one or multiple CCs currently used by the UE need to be replaced by newly configured CCs, the UE may achieve the uplink synchronization with the newly configured CCs.

An embodiment of the present invention further provides an uplink synchronization processing method, which includes:

obtaining a downlink timing value T1 and an uplink TA TA1, which are of a currently used CC or CC pair, and a downlink timing value T2 of a newly configured CC or CC pair;

obtaining an uplink TA2 of the newly configured CC through calculation by applying formula (2), $$TA2 = TA1 + 2 \times (T2 - T1) \qquad (2); \text{ and}$$

applying an obtained TA2 to the newly configured CC.

In the embodiment of the present invention, a UE may adjust TA situation of a newly configured CC according to the TA value of an already configured CC, no matter whether multiple CCs share the TA, the UE may calculate an uplink TA of the newly configured CC according to a downlink TA and a uplink TA of the already configured CC and the downlink TA of the newly configured CC. In this embodiment, when a base station needs to configure a new CC for the UE, or one or multiple CCs currently used by the UE need to be replaced by newly configured CCs, the UE may achieve the uplink synchronization with the newly configured CCs.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention; persons skilled in the art may obtain other drawings according to the accompanying drawings without paying creative efforts.

DETAILED DESCRIPTION

The technical solution of the present invention will be clearly and fully described below with reference to the accompanying drawings. It is obvious that the embodiments to be described are only a part rather than all of the embodiments of the present invention. All other embodiments derived by persons skilled in the art based on the embodiments of the present invention without carrying out creative activities should fall within the protection scope of the present invention.

Figure 1:
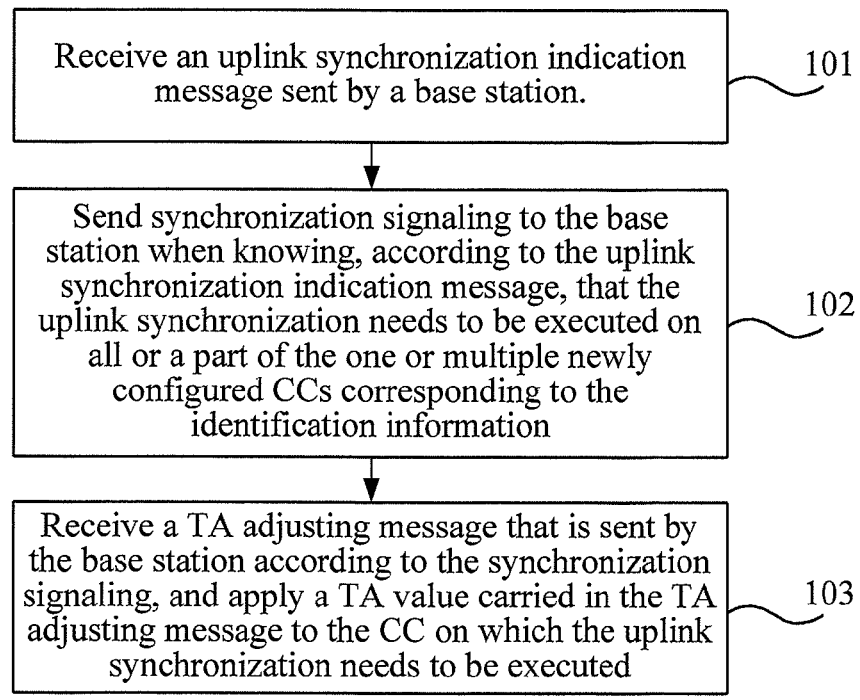
FIG. 1 is a flow chart of Embodiment 1 of an uplink synchronization processing method according to the present invention.

FIG. 1 is a flow chart of Embodiment 1 of an uplink synchronization processing method according to the present invention. As shown in FIG. 1, the method of this embodiment includes the following steps:

Step 101: Receive an uplink synchronization indication message sent by a base station.

The uplink synchronization indication message carries identification information of one or multiple newly configured CCs.

For example, the uplink synchronization indication message may be a CC reconfiguration message or a Physics Downlink Control Channel (PDCCH).

The uplink synchronization indication message carries the identification information of the one or multiple newly configured CCs, and the identification information is used by the base station, for example, an eNodeB, to indicate to the UE which CC(s) is (are) newly configured, or for an FDD system, when the eNodeB reconfigures CCs in pairs, the identification information of the CCs may also represent one or multiple pairs of uplink and downlink CCs. The so-called reconfiguration of the CCs in pairs refers to that the eNodeB notifies to configure an uplink CC and a downlink CC, and the uplink CC and the downlink CC form a CC pair. Under the situation, the identification information of the CCs may be the identification information of the CC pair. The meaning of the identification information of the CCs in other embodiments is the same as the mentioned, so that description is not given in other parts of the embodiments of the present invention.

It should be noted that the CC reconfiguration message may further carry detailed configuration information of the newly configured CCs.

In this embodiment, the uplink synchronization indication message may be sent as an independent radio resource control (Radio Resource Control, RRC) message or a medium access control protocol data unit (Medium Access Control Protocol Data Unit, MAC PDU), or is sent by being carried in an RRC connection reconfiguration message.

Step 102: Send synchronization signaling to the base station when knowing, according to the uplink synchronization indication message, that the uplink synchronization needs to be executed on all or a part of the one or multiple newly configured CCs corresponding to the identification information.

After receiving the uplink synchronization indication message, for example, the CC reconfiguration message or the PDCCH, the UE may know the newly configured CC(s), and also know whether the uplink synchronization needs to be executed on the all or a part of the one or multiple newly configured CCs corresponding to the identification information.

The synchronization signaling is a synchronization sequence. For example, the synchronization signaling of this embodiment may be a dedicated preamble (preamble) or a sounding reference signal (Sounding reference signal, Sounding RS). When the UE needs to execute the uplink synchronization, the CC reconfiguration message or the PDCCH includes a dedicated preamble distributed for the UE, in addition, a manner that the dedicated preamble indicates whether the UE needs to execute the uplink synchronization on the one or multiple newly configured CCs may be:

1. Explicit indication: in the CC reconfiguration message or the PDCCH, dedicated bit indication information indicates whether the UE requires executing the uplink synchronization on all or a part of the one or multiple CCs; and 2. Implicit indication: if the CC reconfiguration message or the PDCCH includes distribution information of the dedicated preamble, it represents that the UE needs to execute the uplink synchronization on all or a part of the one or multiple CCs, if the CC reconfiguration message or the PDCCH does not include the distribution information of the dedicated preamble, it represents that the UE may not execute the uplink synchronization; that is, the UE may judge whether the CC reconfiguration message or the PDCCH includes the dedicated preamble, if the CC reconfiguration message or the PDCCH includes the dedicated preamble, the UE executes the uplink synchronization by using the preamble.

Therefore, the knowing, according to the uplink synchronization indication message, that the uplink synchronization needs to be executed on all or a part of the one or multiple newly configured CCs corresponding to the identification information in step 102 may include:

knowing that the uplink synchronization needs to be executed on the all or a part of the one or multiple newly configured CCs corresponding to the identification information, according to bit indication information which is in the uplink synchronization indication message and is used to indicate whether the uplink synchronization needs to be executed on all or a part of the one or multiple newly configured CCs; or knowing that the uplink synchronization needs to be executed on all or a part of the one or multiple newly configured CCs corresponding to the identification information, according to distribution information of dedicated preamble in the uplink synchronization indication message.

Therefore, when judging, according to the uplink synchronization indication message, that the uplink synchronization needs to be executed, the UE may obtain a corresponding dedicated preamble from the uplink synchronization indication message, and when executing the uplink synchronization, the UE may send the dedicated preamble to the base station, to request the base station to indicate, according to the dedicated preamble, a TA value that can be used.

Step 103: Receive a TA adjusting message that is sent by the base station according to the synchronization signaling, and apply a TA value carried in the TA adjusting message to the CC on which the uplink synchronization needs to be executed.

After receiving the dedicated preamble sent by the UE, the base station sends the TA adjusting message to the UE, where the TA adjusting message carries the TA value required to be applied to the newly configured CC on which the uplink synchronization needs to be executed.

During specific implementation, the UE may obtain $TA_{new}$ required to be used on the CC on which the uplink synchronization needs to be executed through calculation by applying formula (1), and apply the $TA_{new}$ to the CC, $$TA_{new} = TA_{reference} + (TA-M) \times Ts \quad (1)$$

where $TA_{reference}$ represents a TA value on a currently used CC, a reference value sent by the base station in the uplink synchronization indication message, or the TA value on the CC when an RRC connection is established at the first time, or a TA value on an anchor CC; M is a preset empirical value; $T_S = 1/(15000 \times 2048)$.

Till now, the UE may use the $TA_{new}$ on the CC on which the uplink synchronization needs to be executed, so that when the base station needs to configure a new CC for the UE, or one or multiple CCs currently used by the UE need to be replaced by newly configured CCs, the UE may achieve the uplink synchronization with the newly configured CCs by using the $TA_{new}$. Further, during the procedure, the UE is triggered to execute the uplink synchronization only through the uplink synchronization indication message, to save downlink radio resources, and when the UE needs to execute the uplink synchronization, the UE may send the synchronization signaling, for example, the dedicated preamble, to the base station, to obtain a TA value required to be used on the newly configured CC from the base station, thereby improving an uplink synchronization speed.

In another embodiment of the uplink synchronization processing method according to the present invention, when it is known, according to the uplink synchronization indication message, that the uplink synchronization does not need to be executed on all or a part of the one or multiple newly configured CCs corresponding to the identification information, the indicated TA value in the uplink synchronization indication message is applied to the newly configured CC on which the uplink synchronization does not need to be executed; or when it is known that the uplink synchronization does not need to be executed on all or a part of the one or multiple newly configured CCs corresponding to the identification information according to the uplink synchronization indication message, a unique TA value on the currently used CC is applied to all or a part of CCs on which the uplink synchronization does not need to be executed on the one or multiple newly configured CCs.

The knowing, according to the uplink synchronization indication message, that the uplink synchronization does not need to be executed on the all or a part of the one or multiple newly configured CCs corresponding to the identification information, may include:

when a TA value of one newly configured CC is the same as a TA value of any CC in the currently used one or multiple CCs, the indicated TA value includes: the TA value that is on the one newly configured CC and requires adjustment, or identification information of the currently used CC, the identification information of the CC represents that the TA value required to be used on the newly configured CC is the same as the TA value on the CC corresponding to the identification information of the CC;

when the TA values of the multiple newly configured CCs are the same as the TA value of the currently used CC, the indicated TA value includes: the TA values respectively corresponding to the multiple newly configured CCs, indices of the TA values respectively corresponding to the multiple newly configured CCs, or a index of the currently used CC, and the TA value required to be used by the newly configured CC is the same as the TA value on the CC corresponding to the index of the CC.

Specifically, if the UE does not need to execute the uplink synchronization, the base station may indicate to the UE the TA values that can be used, and a specific manner may be:

when the UE is currently only configured to use one CC or TA values of the multiple currently used CCs are the same, the base station indicates to the UE whether the currently used TA value may be used;

alternatively, when the UE is currently only configured to use multiple CCs, and the UE is using multiple different TA values, the base station indicates to the UE the TA values that should be used on the newly configured CCs. Under the situation, the base station may directly notify the UE of the TA values required to be used by the UE, and may also number the TA values currently used by the UE, and notify the UE of the indices of the TA values required to be used on the newly configured CCs, or may notify the UE of the index of a certain currently used CC, and the UE receives index information of the CC, which represents that the newly configured CC may use the TA value of the CC corresponding to the index.

Further, in another situation, when it is known, according to the uplink synchronization indication message, that the uplink synchronization does not need to executed on all or a part of the one or multiple newly configured CCs corresponding to the identification information, the unique TA value on the currently used CC is applied to the CC on which the uplink synchronization does not need to be executed on the one or multiple newly configured CCs. Specifically, the UE and the base station may know in advance that the TA values of the CCs currently used by the UE are the same, that is, all the CCs use the unique TA value, and here, the base station does not need to exclusively indicate the TA value to the UE. When the UE knows, after receiving the uplink synchronization indication message, that the uplink synchronization does not need to be executed on all or a part of the one or multiple newly configured CCs corresponding to the identification information, the UE may directly apply the unique TA value of the currently used CC to the newly configured CC on which the uplink synchronization does not need to be executed.

Therefore, when the UE knows, according to the received uplink synchronization indication message, that the uplink synchronization does not need to be executed on the all or a part of the one or multiple newly configured CCs corresponding to the identification information, the UE may directly apply the indicated TA value in the uplink synchronization indication message to a CC that is in the newly configured CCs and on which the uplink synchronization does not need to be executed, or directly apply the unique TA value of the currently used CC to the newly configured CC on which the uplink synchronization does not need to be executed, so that when the UE does not need to execute the uplink synchronization, the UE may achieve the uplink synchronization with the newly configured CCs.

Figure 2:
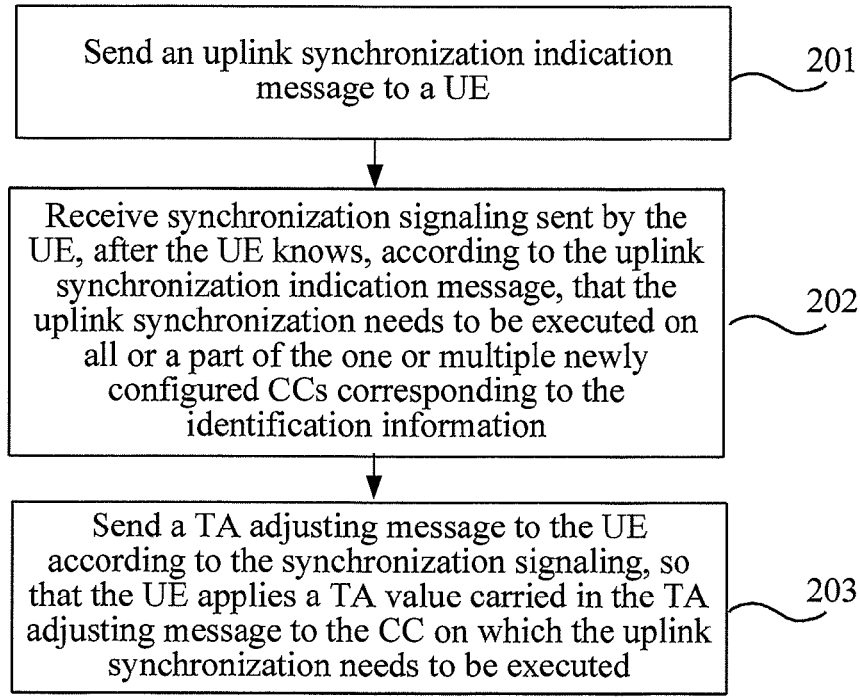
FIG. 2 is a flow chart of Embodiment 2 of an uplink synchronization processing method according to the present invention.

FIG. 2 is a flow chart of Embodiment 2 of an uplink synchronization processing method according to the present invention. As shown in FIG. 2, the method of this embodiment may include the following steps:

Step 201: Send an uplink synchronization indication message to a UE.

The uplink synchronization indication message carries identification information of one or multiple newly configured CCs.

For example, the uplink synchronization indication message may be a CC reconfiguration message or a PDCCH.

The uplink synchronization indication message may be sent as an RRC message or an MAC PDU, or is sent by being carried in an RRC connection reconfiguration message.

Specifically, when the UE needs to execute uplink synchronization, the uplink synchronization indication message may include a dedicated preamble or a Sounding RS where the dedicated preamble or the Sounding RS is distributed for the UE, and a manner that the dedicated preamble or the Sounding RS indicates whether the UE needs to execute the uplink synchronization on the one or multiple newly configured CCs may be the explicit indication or the implicit indication, which is not described here again.

Therefore, the sending the uplink synchronization indication message to the UE in step 201 may include: sending an extended TA value adjusting command to the UE; correspondingly, the method further includes: sending the CC reconfiguration message to the UE, so that the UE obtains configuration information of the CC corresponding to the identification information according to the CC reconfiguration message; or may include: sending the CC reconfiguration message to the UE, where the CC reconfiguration message includes a TA value of the UE, which is on the one newly configured CC and requires adjustment, or the CC reconfiguration message includes one or multiple TA values of the UE, which is on the multiple newly configured CCs and requires adjustment, and identification information of the CC corresponding to each TA value.

Step 202: Receive synchronization signaling sent by the UE, after the UE knows, according to the uplink synchronization indication message, that the uplink synchronization needs to be executed on all or a part of the one or multiple newly configured CCs corresponding to the identification information.

When the UE judges, according to the uplink synchronization indication message, that the uplink synchronization needs to be executed, the UE may obtain the corresponding dedicated preamble or the Sounding RS from the uplink synchronization indication message. When executing the uplink synchronization, the UE may send the dedicated preamble or the Sounding RS to the base station, and the base station may indicate, according to the dedicated preamble or the Sounding RS, to the UE the TA values that can be used.

The base station may newly configure a CC for the UE according to a bandwidth demand, or may also newly configure multiple CCs or multiple CC groups (an uplink CC and a downlink CC may be called a CC group) for the UE. For the situation of newly configuring multiple CCs or multiple CC groups, the base station may only distribute a dedicated preamble for the UE, that is, the dedicated preamble is shared by multiple CCs; of course, multiple preambles may also be distributed to the UE. Therefore, the receiving the dedicated preamble sent by the UE in step 202 may include: receiving a dedicated preamble sent by the UE, where the dedicated preamble is sent on all or a part of CCs on which the uplink synchronization needs to be executed on the multiple newly configured CCs; or receiving multiple dedicated preambles sent by the UE, where the multiple dedicated preambles are sent on all or a part of CCs on which the uplink synchronization needs to be executed on the multiple newly configured CCs Step 203: Send a TA adjusting message to the UE according to the synchronization signaling, so that the UE applies a TA value carried in the TA adjusting message to the CC on which the uplink synchronization needs to be executed.

For example, the synchronization signaling is the dedicated preamble, and after receiving the dedicated preamble sent by the UE, the base station may send the TA adjusting message to the UE, where the TA adjusting message may carry the TA value required to be applied to the newly configured CCs on which the uplink synchronization needs to be executed.

The sending the TA adjusting message to the UE may include: sending the extended TA value adjusting command to the UE, where the extended TA value adjusting command includes the TA value of the UE, which is on the one newly configured CC and requires adjustment, or the extended TA value adjusting command includes one or multiple TA values of the UE, which are on the multiple newly configured CCs and require adjustment, and identification information of the CC corresponding to each TA value.

During specific implementation, the UE may obtain $TA_{new}$ required to be used on the CC on which the uplink synchronization needs to be executed through calculation by applying formula (1), and apply the $TA_{new}$ to the CC that needs to execute the uplink synchronization.

Till now, the UE may use the $TA_{new}$ on the CC on which the uplink synchronization needed to be executed, so that when the base station needs to configure a new CC for the UE, or one or multiple CCs currently used by the UE needs to be replaced by newly configured CCs, the UE may achieve the uplink synchronization with the newly configured CCs by using the $TA_{new}$. Further, during the procedure, the UE is triggered to execute the uplink synchronization only through an uplink synchronization indication message, to save downlink radio resources, and when the UE needs to execute the uplink synchronization, the UE may send the synchronization signaling, for example, the dedicated preamble to the base station, to obtain the TA values required to be used on the newly configured CCs from the base station, thereby improving an uplink synchronization speed.

In another embodiment of the uplink synchronization processing method according to the present invention, when the base station does not need the UE to execute the uplink synchronization, a manner in the following may be adopted.

The uplink synchronization indication message carrying the indicated TA value is sent to the UE, when a TA value of one newly configured CC is the same as a TA value of any CC in the currently used one or multiple CCs, the indicated TA value may include: the TA value that is on the one newly configured CC and require adjustment, or identification information of the currently used CC, the identification information of the CC represents that the TA value required to be used on the newly configured CC is the same as the TA value on the CC corresponding to the identification information of the CC;

when the TA values of the multiple newly configured CCs are the same as the TA value of the currently used CC, the indicated TA value may include: the TA values respectively corresponding to the multiple newly configured CCs, indices of the TA values respectively corresponding to the multiple newly configured CCs, or a index of the currently used CC, and the TA value required to be used by the newly configured CC is the same as the TA value of the CC corresponding to the index of the CC.

Specifically, if the UE does not need to execute the uplink synchronization, the base station indicates to the UE the TA values that can be used, and a specific manner may be:

when the UE is currently only configured to use one CC or TA values of the multiple currently used CCs are the same, the base station indicates to the UE whether the currently used TA value may be used;

alternatively, when the UE is currently only configured to use multiple CCs, and the UE is using multiple different TA values, the base station indicates to the UE the TA values used on the newly configured CCs. Under the situation, the base station may directly notify the UE of the TA values required to be used by the UE, and may also number the TA values currently used by the UE, and notify the UE of the indices of the TA values required to be used on the newly configured CCs, or may notify the UE of the index of a certain currently used CC, and the UE receives index information of the CC, which represents that the newly configured CC may use the TA value on the CC corresponding to the index.

Further, in another situation, when it is known, according to the uplink synchronization indication message, that the uplink synchronization does not need to be executed on all or a part of the one or multiple newly configured CCs corresponding to the identification information, the unique TA value on the currently used CC is applied to all or a part of the CCs on which the uplink synchronization does not need to be executed in the one or multiple newly configured CCs. Specifically, the UE and the base station may know in advance that the TA values of the CCs currently used by the UE are the same, that is, all the CCs use the unique TA value, and here, the base station does not need to exclusively indicate the TA value to the UE. When the UE knows, after receiving the uplink synchronization indication message, that the uplink synchronization does not need to be executed on all or a part of the one or multiple newly configured CCs corresponding to the identification information, the UE may directly apply the unique TA value of the currently used CC to the newly configured CC on which the uplink synchronization does not need to be executed.

Therefore, when the UE knows, according to the received uplink synchronization indication message, that the uplink synchronization does not need to be executed on all or a part of the one or multiple newly configured CCs corresponding to the identification information, the UE may directly apply the indicated TA value in the uplink synchronization indication message to a CC that is in the newly configured CCs and on which the uplink synchronization does not need to be executed, or directly apply the unique TA value of the currently used CC to the newly configured CC on which the uplink synchronization does not need to be executed, so that when the UE does not need to execute the uplink synchronization, the UE may achieve the uplink synchronization with the newly configured CCs.

In the following, the above mentioned embodiment is described in detail by adopting several detailed embodiments, and the following embodiments make descriptions by taking an example that the synchronization signaling is the dedicated preamble.

Figure 3:
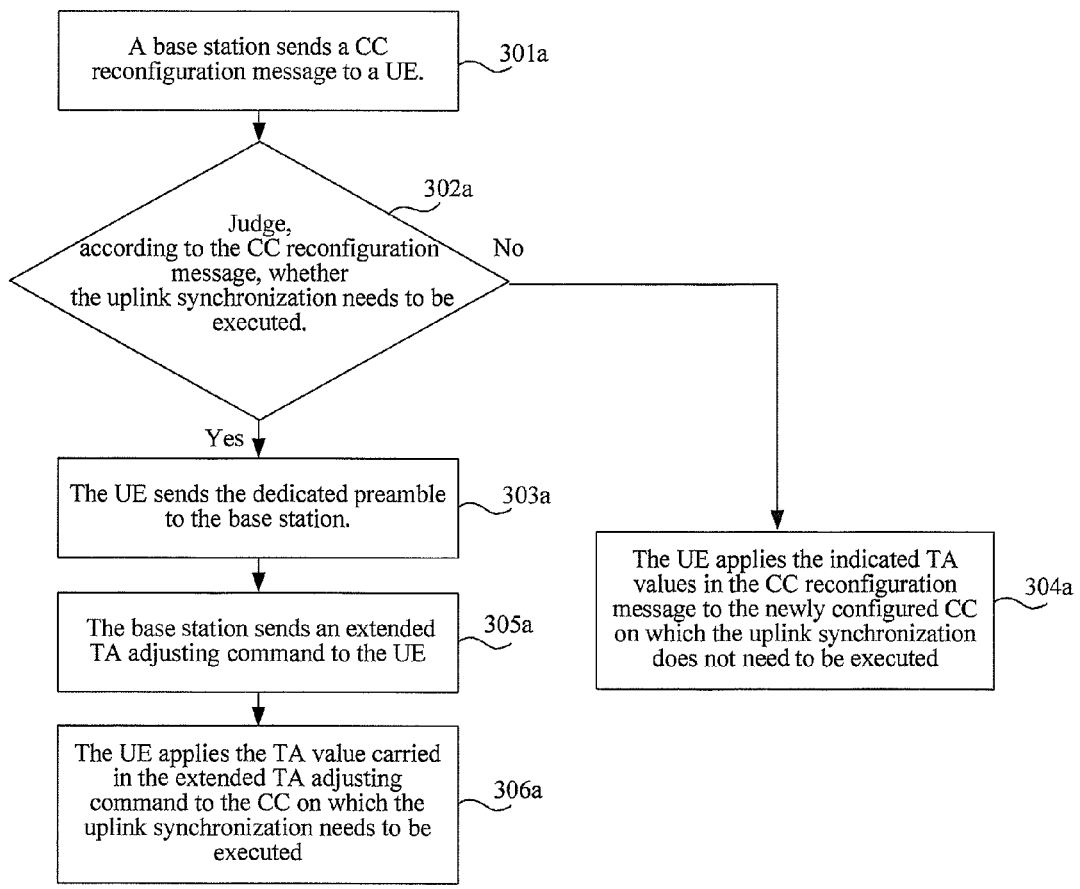
FIG. 3 is a flow chart of Embodiment 3 of an uplink synchronization processing method according to the present invention.

FIG. 3 is a flow chart of Embodiment 3 of an uplink synchronization processing method according to the present invention. As shown in FIG. 3, the method of this embodiment may include the following steps:

Step 301a: A base station sends a CC reconfiguration message to a UE.

The CC reconfiguration message carries identification information of one or multiple newly configured CCs, where the identification information is used by the base station to indicate newly configured CC (s) to the UE. The CC reconfiguration message may carry detailed configuration information of the newly configured CCs.

After receiving the CC reconfiguration message, the UE may know the newly configured CC (s), and may also know whether the uplink synchronization needs to be executed on the all or a part of the one or multiple newly configured CCs corresponding to the identification information.

Step 302a: The UE judges, according to the CC reconfiguration message, whether the uplink synchronization needs to be executed, and if the UE judges that the uplink synchronization needs to be executed, step 303a is executed, and if the UE judges that the uplink synchronization does not need to be executed, step 304a is executed.

Specifically, when the UE needs to execute the uplink synchronization, the CC reconfiguration message includes a dedicated preamble distributed for the UE.

When the UE does not need to execute the uplink synchronization, TA values that can be used are indicated to the UE, and a specific manner is described in the above mentioned embodiment, and is not described here again.

After the UE receives the CC reconfiguration message, if the CC reconfiguration message indicates the dedicated preamble, it represents that the UE needs to execute the uplink synchronization on all or a part of the one or multiple CCs, and if the CC reconfiguration message indicates relevant information of the TA, the UE does not need to execute the uplink synchronization, and the UE may directly realize the uplink synchronization with the newly configured CCs according to the relevant information of the TA.

Step 303a: The UE sends the dedicated preamble to the base station, and step 305a is executed.

In this embodiment, the base station may newly configure a CC for the UE according to a bandwidth demand, or may also newly configure multiple CCs or multiple CC groups (an uplink CC and a downlink CC may be called a CC group) for the UE. For the situation of newly configuring multiple CCs or multiple CC groups, the base station may only distribute a dedicated preamble for the UE, that is, the dedicated preamble is shared by multiple CCs; of course, multiple preambles may be distributed to the UE.

When knowing, after receiving the CC reconfiguration message sent by the base station, that it is required to execute the uplink synchronization, the UE sends the indicated dedicated preamble in the CC reconfiguration message to the base station, so that the base station may feedback the TA values to the UE according to the dedicated preamble.

Step 304a: The UE applies the indicated TA values in the CC reconfiguration message to the newly configured CC on which the uplink synchronization does not need to be executed.

Step 305a: The base station sends an extended TA adjusting command to the UE.

The extended TA adjusting command may include identification information of the CC corresponding to the TA value. When only one or a pair of newly configured CCs exist, or when only one or a pair of CCs in the multiple newly configured CCs on which the uplink synchronization needs to be executed, the extended TA adjusting command may not include the identification information of the CC, and the TA adjusting command is TA adjustment corresponding to the newly configured CCs by default. Then, the UE applies the TA value to the CC that is in the newly configured CCs and on which the uplink synchronization needs to be executed.

Figure 4:
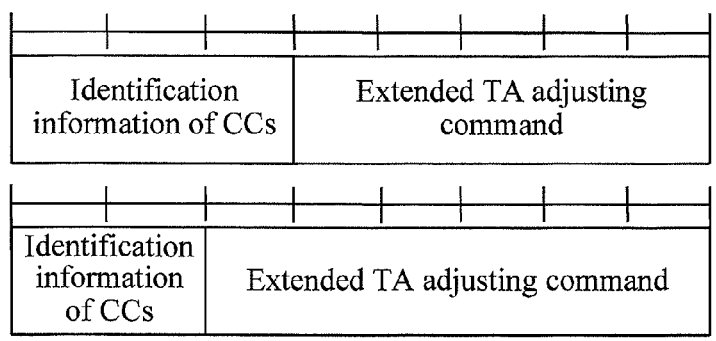
FIG. 4 is a schematic structural diagram of a TA adjusting command in Embodiment 3 of the uplink synchronization processing method according to the present invention.

For example, the extended TA adjusting command may be an MAC PDU. FIG. 4 is a schematic structural diagram of a TA adjusting command in Embodiment 3 of the uplink synchronization processing method according to the present invention. As shown in FIG. 4, the identification information of the CC, that is, a bit index of a CC index is 2-3 bits, and a index of the bit occupied by the extended TA adjusting command extended TA command may be 5-6 bits, or more bits. In order to differentiate the MAC PDU in this embodiment from other MAC PDUs received by the UE, the MAC PDU of the extended TA adjusting command of this embodiment may be sent by using a reserved logic channel in a current LTE system, for example, a logic channel with an index number being 11011, and of course, reserved logic channels in other LTE systems may also be used.

Step 306a: The UE applies the TA value carried in the extended TA adjusting command to the CC on which the uplink synchronization needs to be executed.

For example, the UE may calculate the TA value by adopting formula (1), or a manner for calculating the TA may also be: $TA_{new}=TA \times Ts$.

In addition, in the embodiment, when the base station newly configures, for the UE, multiple CCs on which the uplink synchronization needs to be executed in the CC reconfiguration message, the base station may explicitly notify the UE of the CC on which the TA adjusting command is received in the CC reconfiguration message. That is, when the base station sends the CC reconfiguration message to the UE, the base station indicates to the UE the identification information of the CC used to receive the TA adjusting command. Alternatively, the base station may notify the UE of the identification information of the CC used to receive the TA adjusting command by using dedicated RRC signaling or MAC PDU, or physical layer signaling. In other embodiments of the present invention, the method for receiving the TA adjusting command may use the above method. Therefore, in other parts of the present invention, the description is not repeated.

Till now, the UE may use the $TA_{new}$ on the CC on which the uplink synchronization needs to be executed, so that when the base station needs to configure a new CC for the UE, or one or multiple CCs currently used by the UE need to be replaced by newly configured CCs, the UE may achieve the uplink synchronization with the newly configured CCs by using the $TA_{new}$. Further, during the procedure, the UE is triggered to execute the uplink synchronization only through the uplink synchronization indication message, to save downlink radio resources, and when the UE needs to execute the uplink synchronization, the UE may send the dedicated preamble to the base station, to obtain TA values required to be used on the newly configured CCs from the base station, thereby improving an uplink synchronization speed.

In addition, in the embodiment, when the UE performs communication by using multiple CCs, when the base station needs the UE to accurately adjust a current TA value on the multiple currently used CCs, the base station may use the extended TA adjusting command MAC PDU as shown in FIG. 4 and described in step 305a. That is, when the base station needs to accurately adjust the TA values of the multiple CCs currently used by the UE, the base station may send the extended TA adjusting command MAC PDU to the UE, where the TA adjusting command MAC PDU includes the identification information of the CC that requires adjustment of the UE, and the corresponding TA value that requires adjustment. Under the situation, the TA value that requires adjustment is different from the TA value that requires adjustment in step 305 that adjustment granularity of the TA value under the situation is more accurate. After receiving the TA adjusting command MAC PDU, correspondingly the UE adjusts the TA values that are on each CC indicated in the command and require adjustment. In other embodiments of the present invention, the above accurate adjustment procedure may exist, so description is not repeated in other embodiments.

Further, the CC reconfiguration message of this embodiment may include information of a physics uplink shared channel (Physics Uplink Shared Channel, PUSCH) resource used to send the dedicated preamble to the base station, and the information of the frame starting from which the PUSCH resource is used. Specifically, when distributing the dedicated preamble for the UE of the CCs to be reconfigured, the base station dispatches, on the PUSCH channel of the CCs to be configured, dedicated resource of sending the dedicated preamble, and in the embodiment, the dedicated PUSCH resource may be distributed for the UE in the CC reconfiguration message of triggering the UE to execute the uplink synchronization, so that the UE dispatches, on the newly configured CCs, the PUSCH resource to send the dedicated preamble. Here, the CC reconfiguration message needs to explicitly notify the UE of a index of the frame used to send the dedicated PUSH resource of the dedicated Preamble. When sending the CC reconfiguration message to the UE, the base station dispatches the UE to send the dedicated PUSCH resource of the dedicated Preamble, so that negative effects caused by the CC reconfiguration process on a normal random access procedure are effectively reduced.

Figure 5:
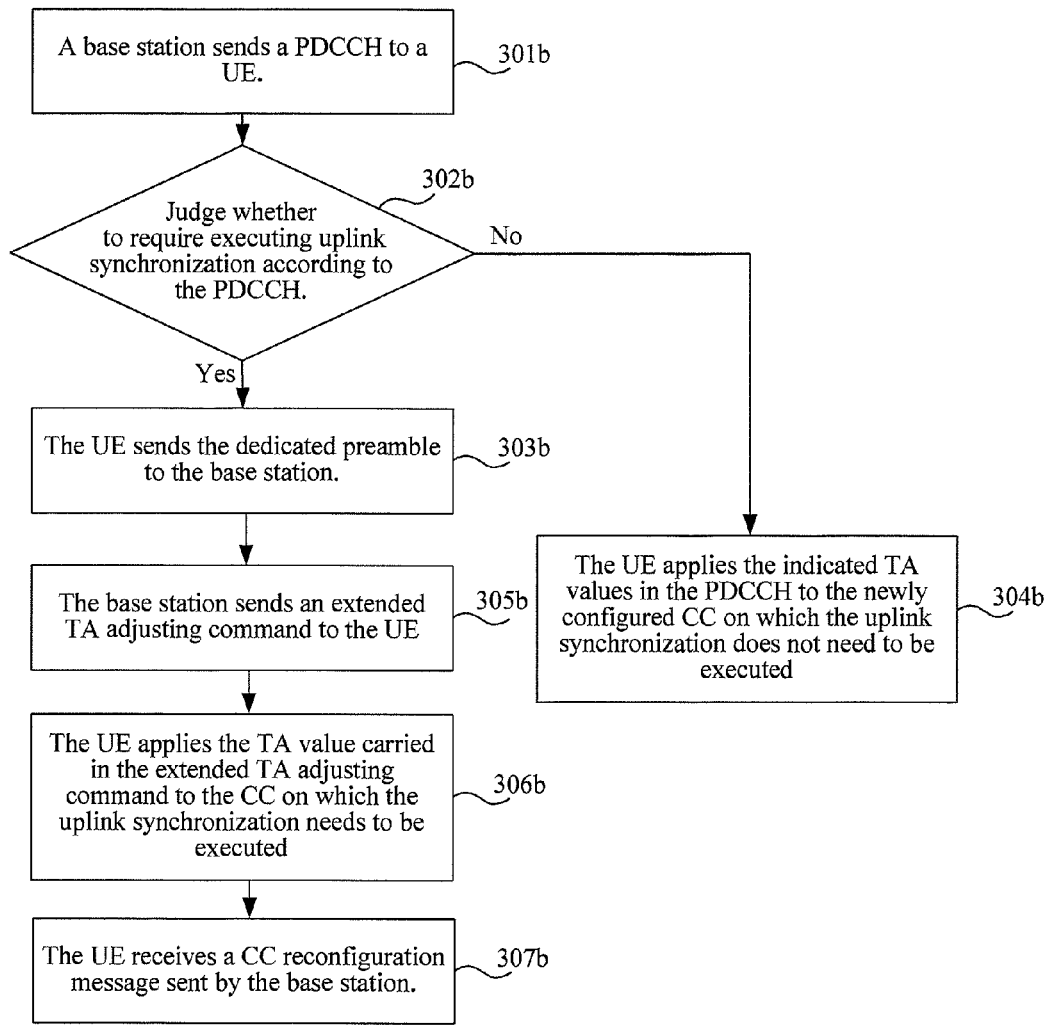
FIG. 5 is a flow chart of Embodiment 4 of an uplink synchronization processing method according to the present invention.

FIG. 5 is a flow chart of Embodiment 4 of an uplink synchronization processing method according to the present invention. As shown in FIG. 5, the method of this embodiment may include the following steps:

Step 301b: A base station sends a PDCCH to a UE.

The PDCCH may carry identification information of one or multiple newly configured CCs, where the identification information is used by the base station to indicate newly configured CC(s) to the UE.

Step 302b: The UE judges, according to the PDCCH, whether uplink synchronization needs to be executed, and if the UE judges that the uplink synchronization needs to be executed, step 303b is executed, and if the UE judges that the uplink synchronization does not need to be executed, step 304b is executed.

Specifically, when the UE needs to execute the uplink synchronization, the PDCCH includes a dedicated preamble distributed for the UE.

When the UE does not need to execute the uplink synchronization, TA values that can be used are indicated for the UE, and a specific manner is not described here again.

After the UE receives the PDCCH, if the PDCCH indicates the dedicated preamble, it represents that the UE needs to execute the uplink synchronization on all or a part of the one or multiple CCs, and if the PDCCH indicates relevant information of the TA, the UE does not need to execute the uplink synchronization, and the UE may directly realize the uplink synchronization with the newly configured CCs according to the relevant information of the TA.

Step 303b: The UE sends the dedicated preamble to the base station, and step 305b is executed.

The base station may newly configure a CC for the UE according to a bandwidth demand, or may also newly configure multiple CCs or multiple CC pairs for the UE. For the situation of newly configuring multiple CCs or multiple CC pairs, the base station may only distribute a dedicated preamble for the UE, that is, the dedicated preamble is shared by multiple CCs; of course, multiple preambles may be distributed to the UE.

When knowing, after receiving the PDCCH sent by the base station, that it is required to execute the uplink synchronization, the UE sends the indicated dedicated preamble in the PDCCH to the base station, so that the base station may feed back the TA values to the UE according to the dedicated preamble.

Step 304b: The UE applies the indicated TA values in the PDCCH to the newly configured CC on which the uplink synchronization does not need to be executed.

Step 305b: The base station sends an extended TA adjusting command to the UE.

The extended TA adjusting command may include identification information of the CC corresponding to the TA value. When only one or a pair of newly configured CCs exist, or when only one or a pair of CCs in the multiple newly configured CCs on which the uplink synchronization needs to be executed, the extended TA adjusting command may also not include the identification information of the CC, and the TA adjusting command is TA adjustment corresponding to the newly configured CCs by default. Then, the UE applies the TA value to the CC that is in the newly configured CCs and on which the uplink synchronization needs to be executed.

For example, the extended TA adjusting command may be an MAC PDU, and a structure may be the structure as shown in FIG. 4 and is not described again.

Step 306b: The UE applies the TA value carried in the extended TA adjusting command to the CC on which the uplink synchronization needs to be executed.

A method for calculating the TA value by the UE is not described again.

Till now, the UE may use the $TA_{new}$ on the CC on which the uplink synchronization needs to be executed, so that when the base station needs to configure a new CC for the UE, or one or multiple CCs currently used by the UE need to be replaced by newly configured CCs, the UE may achieve the uplink synchronization with the newly configured CCs by using the $TA_{new}$. Further, during the procedure, the UE is triggered to execute the uplink synchronization only through the uplink synchronization indication message, to save downlink radio resources, and when the UE needs to execute the uplink synchronization, the UE may send the dedicated preamble to the base station, to obtain TA values required to be used on the newly configured CCs from the base station, thereby improving an uplink synchronization speed.

Step 307b: The UE receives a CC reconfiguration message sent by the base station.

In this embodiment, the PDCCH triggers the UE to perform the uplink synchronization and does not include detailed configuration information of the newly configured CCs, so that in this embodiment, the base station may send the CC reconfiguration message to the UE, so that the UE obtains the configuration information of the CC corresponding to the identification information according to the CC reconfiguration message.

Further, in this embodiment, the dedicated PUSCH resource may be distributed to the UE, so that the UE may dispatch, on the newly distributed CC, the PUSCH resource to send the dedicated preamble, so that negative effects caused by the CC reconfiguration process on a normal random access procedure are effectively reduced.

Figure 6:
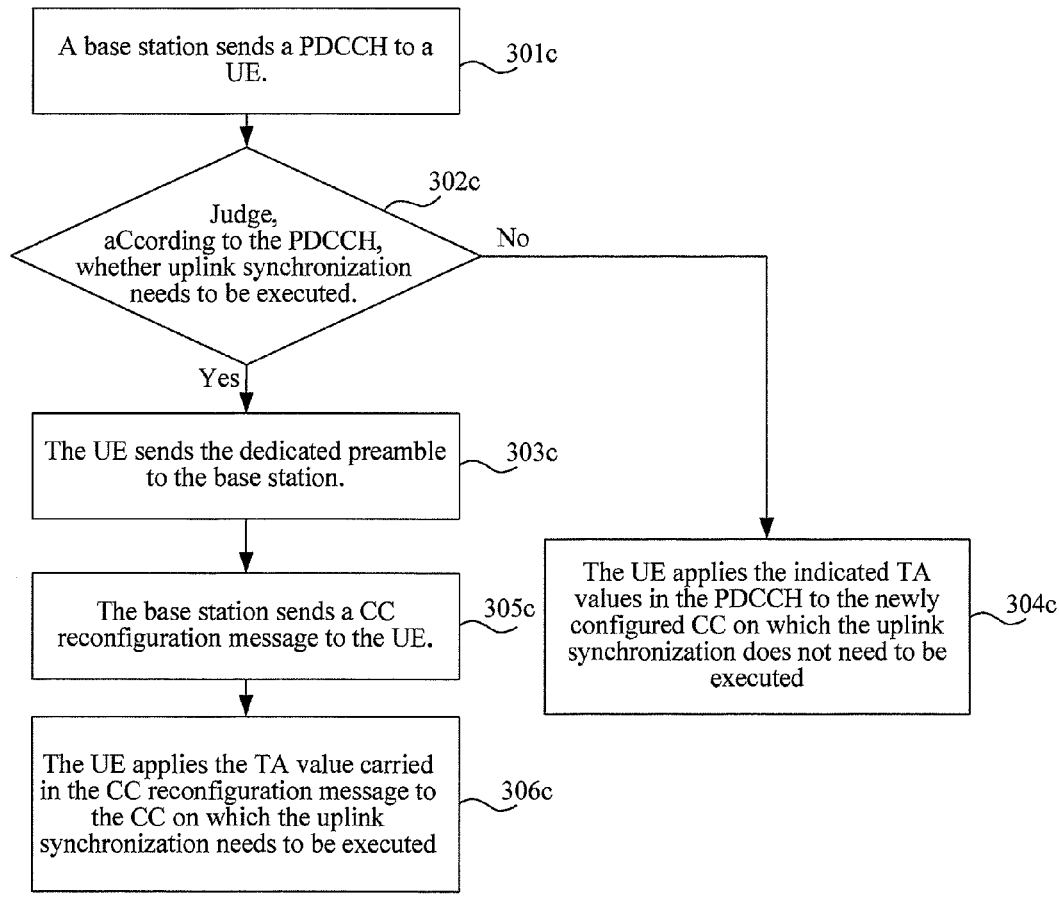
FIG. 6 is a flow chart of Embodiment 5 of an uplink synchronization processing method according to the present invention.

FIG. 6 is a flow chart of Embodiment 5 of an uplink synchronization processing method according to the present invention. As shown in FIG. 6, the method of this embodiment may include the following steps:

Step 301c: A base station sends a PDCCH to a UE.

The PDCCH may carry identification information of one or multiple newly configured CCs, where the identification information is used by the base station to indicate newly configured CC (s) to the UE.

Step 302c: The UE judges, according to the PDCCH, whether uplink synchronization needs to be executed, and if the UE judges that the uplink synchronization needs to be executed, step 303c is executed, and if the UE judges that the uplink synchronization does not to need to be executed, step 304c is executed.

Specifically, when the UE needs to execute the uplink synchronization, the PDCCH includes a dedicated preamble distributed for the UE, and the dedicated preamble may adopt the implicit indication or the explicit indication.

When the UE does not need to execute the uplink synchronization, TA values that can be used are indicated to the UE, and a specific manner is not described here again.

After the UE receives the PDCCH, if the PDCCH indicates the dedicated preamble, it represents that the UE needs to execute the uplink synchronization on all or a part of the one or multiple newly configured CCs, and if the PDCCH indicates relevant information of the TA, the UE does not need to execute the uplink synchronization, and the UE may directly realize the uplink synchronization with the newly configured CCs according to the relevant information of the TA.

Step 303c: The UE sends the dedicated preamble to the base station, and step 305c is executed.

The base station may newly configure a CC for the UE according to a bandwidth demand, or may also newly configure multiple CCs or multiple CC pairs for the UE. For the situation of newly configuring multiple CCs or multiple CC pairs, the base station may only distribute a dedicated preamble to the UE, that is, the dedicated preamble is shared by multiple CCs; of course, multiple preambles may be distributed to the UE.

Step 304c: The UE applies the indicated TA values in the PDCCH to the newly configured CC on which the uplink synchronization does not need to be executed.

Step 305c: The base station sends a CC reconfiguration message to the UE.

The CC reconfiguration message includes a TA value of the UE, which is on the one newly configured CC and requires adjustment, or the CC reconfiguration message includes one or multiple TA values of the UE, which are on the multiple newly configured CCs and require adjustment, and identification information of the CC corresponding to each TA value.

When the base station newly configures a CC for the UE, the UE may obtain a TA value through the CC reconfiguration message; when the base station newly configures multiple CCs for the UE, the CC reconfiguration message may indicate a TA value for the multiple newly configured CCs, and may also indicate the TA values respectively for the multiple CCs, where when the TA values are respectively indicated, it is also necessary to enable the respectively indicated TA values to correspond to the identification information of the corresponding CC.

Step 306c: The UE applies the TA value carried in the CC reconfiguration message to the CC on which the uplink synchronization needs to be executed.

A method for calculating the TA value by the UE is not described again.

Till now, the UE may use the $TA_{new}$ on the CC on which the uplink synchronization needs to be executed, so that when the base station needs to configure a new CC for the UE, or one or multiple CCs currently used by the UE need to be replaced by newly configured CCs, the UE may achieve the uplink synchronization with the newly configured CCs by using the $TA_{new}$. Further, during the procedure, the UE is triggered to execute the uplink synchronization only through the uplink synchronization indication message, to save downlink radio resources, and when the UE needs to execute the uplink synchronization, the UE may send the dedicated preamble to the base station, to obtain TA values required to be used on the newly configured CCs from the base station, thereby improving an uplink synchronization speed.

Further, in this embodiment, the dedicated PUSCH resource may be distributed for the UE, so that the UE may dispatch, on the newly distributed CC, the PUSCH resource to send the dedicated preamble, so that negative effects caused by the CC reconfiguration process on a normal random access procedure are effectively reduced.

Figure 7:
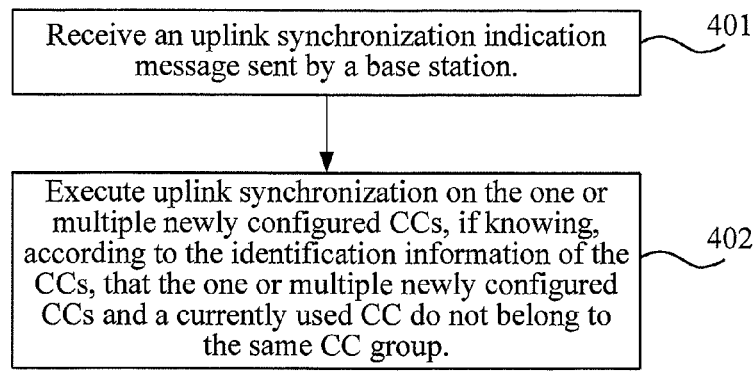
FIG. 7 is a flow chart of Embodiment 6 of an uplink synchronization processing method according to the present invention.

FIG. 7 is a flow chart of Embodiment 6 of an uplink synchronization processing method according to the present invention. As shown in FIG. 7, the method of this embodiment may include the following steps:

Step 401: Receive an uplink synchronization indication message sent by a base station.

The uplink synchronization indication message may be a CC reconfiguration message or a PDCCH.

The uplink synchronization indication message carries identification information of one or multiple newly configured CCs, and the identification information is used by the base station, for example, an eNodeB, to indicate to the UE which CC (s) is (are) newly configured. The CC reconfiguration message may further carry detailed configuration information of the newly configured CCs. In this embodiment, the uplink synchronization indication message may be sent as an independent RRC message or an MAC PDU, or is sent by being carried in an RRC connection reconfiguration message.

Step 402: Execute uplink synchronization on the one or multiple newly configured CCs, if knowing, according to the identification information of the CCs, that the one or multiple newly configured CCs and a currently used CC do not belong to the same CC group.

The CC group is formed by one or multiple CCs sharing the same TA value.

Given a situation that in the multiple CCs, several CCs may share a TA, and the other CCs may share another TA, the CCs may be grouped according to whether the CCs may share the same TA. In order to enable the UE to obtain CC group information in advance, to know, according to the group information, whether the newly configured CCs belong to a certain CC group, and in this embodiment, before step 701, the method may further include: receiving the CC group information sent by the base station in a broadcasting manner or through dedicated signaling, where the CCs in the same CC group share a TA value.

When knowing, according to the identification information of the newly configured CCs, that the one or multiple newly configured CCs and the currently used CC do not belong to the same CC group, the UE executes the uplink synchronization on the one or multiple newly configured CCs. The specific procedure of executing the uplink synchronization may adopt a random access process based on competition. The random access process based on competition may be that: the UE sends a random access Preamble message "Random Access Preamble" to the base station, and selected Preambles (a total index of 64) implicit a size of a firstly dispatched uplink message required to be sent by the UE subsequently; then, the base station delivers a random access response message "Random Access Response" on a downlink synchronization channel, where the message is generated by a physical layer. A Timing Advance Command field in the message includes the TA value of the UE, which requires adjustment during uplink sending, and a UL Grant field represents information of a bandwidth resource distributed to the firstly dispatches uplink message sent by the UE. A Temporary C-RNTI field represents temporary identification information distributed for the UE. RAPID in an MAC Header represents identification information of the preamble sent by the UE, that is, Random Access Preamble ID; in addition, multiple CCs in the CCs newly configured by the base station for the UE need the UE to execute the uplink synchronization, it is necessary to modify an existing random access response message.

When a preamble randomly selected by the UE needs to be sent on the multiple CCs on which the uplink synchronization needs to be executed, in addition to the information required to be carried, the random access response message sent by the base station to the UE further needs to carry the identification information of the CC respectively corresponding to the multiple TA values, so that after receiving the random access response message, the UE may explicitly know a corresponding relationship between the TA value requiring adjustment and the CC.

When the UE randomly selects multiple preambles and sends different preambles on the multiple CCs on which the uplink synchronization needs to be executed, the existing random access response message does not need to be modified.

In addition, after the UE randomly selects the preamble, in order to enable the base station to explicitly know the preamble selected by the UE, the UE sends, on the currently used CC, the identification information of the selected preamble to the base station. When the base station detects, on the CC on which the uplink synchronization needs to be executed, the preamble reported by the UE, the base station may send the TA value to the UE by using the random access response message or the extended TA command message, according to the TA value obtained through the detection of the preamble. Under the situation, the base station identifies the UE based on the preamble, so that the base station may not distribute, in the random access response message, the bandwidth resource used to send the uplink message for the UE, and may omit to send a competition solving message to the UE.

According to indication of the random access response message "Random Access Response", the UE sends the firstly dispatches uplink message on the uplink synchronization channel; and finally, in order to solve a conflict problem caused when the multiple UEs use the same preamble, the base station sends a conflict solving message to the UE.

Preferably, the procedure of executing the uplink synchronization on the one or multiple newly configured CCs of this embodiment may adopt the uplink synchronization method described in any one of Embodiment 1 to Embodiment 5, and is not described again.

In another embodiment of the uplink synchronization processing method according to the present invention, if the one or multiple newly configured CCs and the currently used CC belong to the same CC group, the TA value of the currently used CC is used on the one or multiple CCs.

In this embodiment, when a CC group exists, the UE may know, according to the CC group information and the newly configured identification information, whether the newly configured CCs belong to the certain CC group, and when the newly configured CCs belong to the certain CC group, the UE realizes the uplink synchronization by directly using the TA corresponding to the CC group, and when the newly configured CCs do not belong to the certain CC group, the UE initiates the uplink synchronization operation to the base station, to obtain the TA value used on the newly configured CCs from the base station. Therefore, in this embodiment, when the base station needs to configure a new CC for the UE, or one or multiple CCs currently used by the UE need to be replaced by newly configured CCs, the UE may achieve the uplink synchronization with the newly configured CCs.

Figure 8:
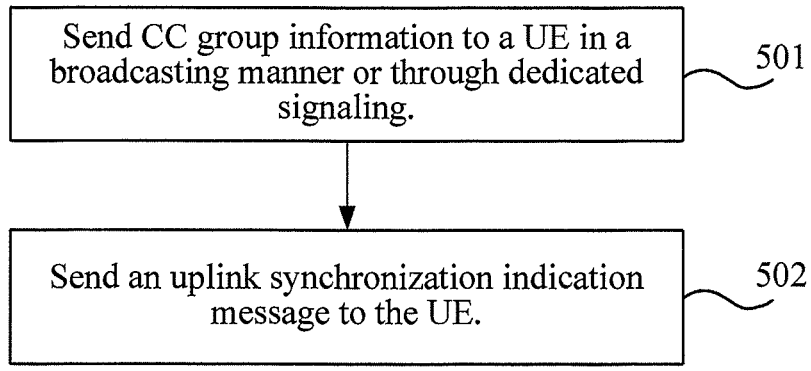
FIG. 8 is a flow chart of Embodiment 7 of an uplink synchronization processing method according to the present invention.

FIG. 8 is a flow chart of Embodiment 7 of an uplink synchronization processing method according to the present invention. As shown in FIG. 8, the method of this embodiment may include the following steps:

Step 501: Send CC group information to a UE in a broadcasting manner or through dedicated signaling.

The CC group information is used to instruct CCs in the same CC group to share a TA value.

Given the situation that in the multiple CCs, several CCs may share a TA, and the other CCs may share another TA, the CCs are grouped according to whether the CCs may share the same TA. In order to enable the UE to obtain CC group information in advance, the UE knows, according to the group information. whether the newly configured CCs belong to a certain CC group.

Step 502: Send an uplink synchronization indication message to the UE.

The uplink synchronization indication message may be a CC reconfiguration message or a PDCCH.

The uplink synchronization indication message carries identification information of one or multiple newly configured CCs, so that when knowing, according to the identification information of the CCs, that the one or multiple newly configured CCs and a currently used CC do not belong to the same CC group, the UE executes uplink synchronization on the one or multiple newly configured CCs.

The uplink synchronization indication message carries the identification information of the one or multiple newly configured CCs, and the identification information is used by the base station, for example, an eNodeB, to indicate to the UE which CC(s) is (are) newly configured. The CC reconfiguration message may further carry detailed configuration information of the newly configured CCs. In this embodiment, the uplink synchronization indication message may be sent as an independent RRC message or an MAC PDU, or is sent by being carried in an RRC connection reconfiguration message.

When knowing, according to the identification information of the CCs, that the one or multiple newly configured CCs and the currently used CC do not belong to the same CC group, the UE executes uplink synchronization on the one or multiple newly configured CCs. The specific procedure of executing the uplink synchronization may adopt a random access procedure based on competition.

Preferably, the procedure of executing the uplink synchronization on the one or multiple newly configured CCs of this embodiment may adopt the uplink synchronization method described in any one of Embodiment 1 to Embodiment 5, and is not described again.

Further, when the UE executes handover between the base stations, a target base station may distributes multiple CCs for the UE to use after the handover in a handover command. When the multiple CCs cannot share the same TA, the base station may notify the UE of the CC group information in the handover command.

After receiving the handover command, the UE may select, based on the group information of the multiple CCs obtained in the handover command, one CC from each CC group to execute the uplink synchronization. Alternatively, the base station may designate, in the handover command, one CC used to execute the uplink synchronization in each CC group for the UE.

In this embodiment, when the CC group exists, the UE may know, according to the CC group information and the newly configured identification information, whether the newly configured CCs belong to a certain CC group, and when the newly configured CCs belong to the certain CC group, the UE realizes the uplink synchronization by directly using the TA corresponding to the CC group, and when the newly configured CCs do not belong to the certain CC group, the UE initiates the uplink synchronization operation to the base station, to obtain the TA value used on the newly configured CCs from the base station. Therefore, in this embodiment, when the base station needs to configure a new CC for the UE, or one or multiple CCs currently used by the UE need to be replaced by newly configured CCs, the UE may achieve the uplink synchronization with the newly configured CCs.

Figure 9:
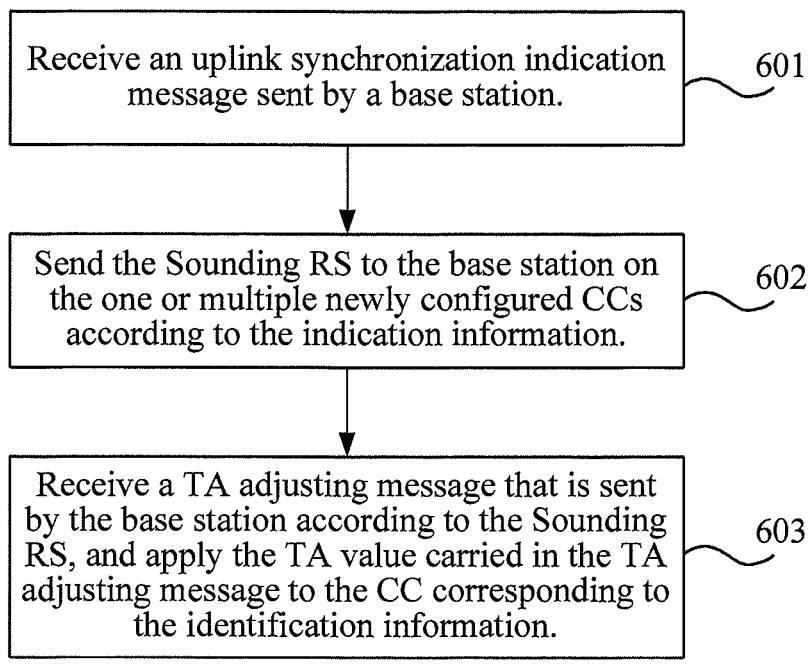
FIG. 9 is a flow chart of Embodiment 8 of an uplink synchronization processing method according to the present invention.

FIG. 9 is a flow chart of Embodiment 8 of an uplink synchronization processing method according to the present invention. As shown in FIG. 9, the method of this embodiment may include the following steps:

Step 601: Receive an uplink synchronization indication message sent by a base station.

The uplink synchronization indication message carries identification information of one or multiple newly configured CCs and indication information of sending a Sounding RS on the one or multiple newly configured CCs.

In this embodiment, the sounding reference signal may be the Sounding RS.

In an LTE system, when communicating with the base station, a UE needs to send the Sounding RS to the base station, to ensure that the base station may detect signal quality of the UE on the entire uplink bandwidth in real time. In this embodiment, when reconfiguring the CC for the UE, the base station may instruct the UE to firstly send the Sounding RS on the newly configured CCs, and then the base station may determine the TA value based on detection of the Sounding RS.

Step 602: Send the Sounding RS to the base station on the one or multiple newly configured CCs according to the indication information.

Step 603: Receive a TA adjusting message that is sent by the base station according to the Sounding RS, and apply the TA value carried in the TA adjusting message to the CC corresponding to the identification information.

In another embodiment of the uplink synchronization processing method of the present invention, the uplink synchronization indication message includes: a CC reconfiguration message, a PDCCH, or an MAC PDU, and the TA adjusting message includes: an extended TA value adjusting command, where the extended TA value adjusting command includes the TA value that is on the one newly configured CC and requires adjustment, or the extended TA value adjusting command includes the one or multiple TA values that are on the multiple newly configured CCs and require adjustment and identification information of the CC corresponding to each TA value.

The extended TA adjusting command may adopt the extended TA adjusting command described in Embodiment 1 to Embodiment 5, and is not described again.

If the uplink synchronization indication message is the PDCCH or the MAC PDU, the TA adjusting message is the CC reconfiguration message, and the CC reconfiguration message includes the TA value that is on the one newly configured CC and requires adjustment, or the CC reconfiguration message includes one or multiple TA values that are on the multiple newly configured CCs and requires adjustment and the identification information of the CC corresponding to each TA value.

In this embodiment, the base station sends the uplink synchronization indication message carrying the indication information enabling the UE to send the Sounding RS to the UE, so that after receiving the uplink synchronization indication message, the UE sends the Sounding RS to the base station, therefore, the base station obtains the TA value used on the CC newly configured for the UE through calculation according to the Sounding RS, and sends the TA value to the UE. Therefore, in this embodiment, when the base station needs to configure a new CC for the UE, or one or multiple CCs currently used by the UE need to be replaced by newly configured CCs, the UE may achieve the uplink synchronization with the newly configured CCs.

Figure 10:
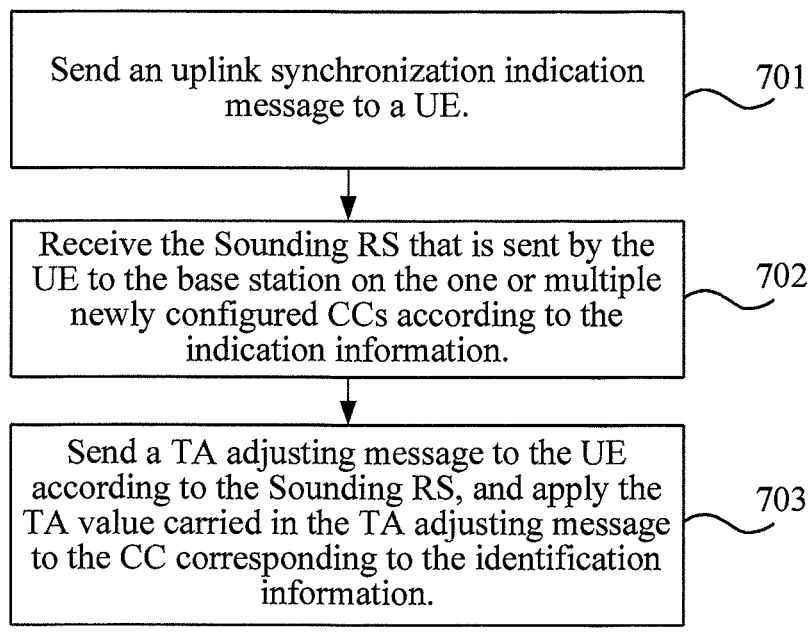
FIG. 10 is a flow chart of Embodiment 9 of an uplink synchronization processing method according to the present invention.

FIG. 10 is a flow chart of Embodiment 9 of an uplink synchronization processing method according to the present invention. As shown in FIG. 10, the method of this embodiment may include the following steps:

Step 701: Send an uplink synchronization indication message to a UE.

The uplink synchronization indication message carries identification information of one or multiple newly configured CCs and indication information of sending a Sounding RS on the one or multiple newly configured CCs.

In this embodiment, the sounding reference signal may be the Sounding RS.

In an LTE system, when communicating with the base station, a UE needs to send the Sounding RS to the base station, to ensure that the base station may detect signal quality of the UE on the entire uplink bandwidth in real time. In this embodiment, when reconfiguring the CC for the UE, the base station may indicate the UE to firstly send the Sounding RS on the newly configured CCs, and then the base station may determine the TA value based on detection of the Sounding RS.

Step 702: Receive the Sounding RS that is sent by the UE to the base station on the one or multiple newly configured CCs according to the indication information.

Step 703: Send a TA adjusting message to the UE according to the Sounding RS, and apply the TA value carried in the TA adjusting message to the CC corresponding to the identification information.

In another embodiment of the uplink synchronization processing method of the present invention, the uplink synchronization indication message includes: a CC reconfiguration message, a PDCCH, or an MAC PDU, and the TA adjusting message includes: an extended TA value adjusting command, where the extended TA value adjusting command includes the TA value that is on the one newly configured CC and requires adjustment, or the extended TA value adjusting command includes the one or multiple TA values that are on the multiple newly configured CCs and require adjustment and identification information of the CC corresponding to each TA value.

The extended TA adjusting command may adopt the extended TA adjusting command described in Embodiment 1 to Embodiment 5, and is not described again.

If the uplink synchronization indication message is the PDCCH or the MAC PDU, the TA adjusting message is the CC reconfiguration message, and the CC reconfiguration message includes the TA value that is on the one newly configured CC and requires adjustment, or the CC reconfiguration message includes one or multiple TA values that are on the multiple newly configured CCs and require adjustment and the identification information of the CC corresponding to each TA value.

In this embodiment, the base station sends the uplink synchronization indication message which carries the indication information enabling the UE to send the Sounding RS to the UE, so that after receiving the uplink synchronization indication message, the UE sends the Sounding RS to the base station, therefore, the base station obtains the TA values used on the CCs newly configured for the UE through calculation according to the Sounding RS, and sends the TA value to the UE. Therefore, in this embodiment, when the base station needs to configure a new CC for the UE, or one or multiple CCs currently used by the UE need to be replaced by newly configured CCs, the UE may achieve the uplink synchronization with the newly configured CCs.

In another embodiment of the uplink synchronization processing method according to the present invention, as long as the UE receives the CC reconfiguration message or the CC reconfiguration message includes the newly configured CCs, the UE executes the uplink synchronization. In this embodiment, a group of preambles may be set in advance, the preambles in the group are dedicatedly used during CC reconfiguration; alternatively, in addition to an original random access channel, a new random access channel is dedicatedly set to send random access preambles during the CC reconfiguration, or during the CC reconfiguration, a PUSCH resource dedicatedly used to send the random access Preambles is dispatched for the UE, to prevent negative effects on the conventional random access procedure. The method of this embodiment may specifically include that: the base station sends the CC reconfiguration message to the UE; after receiving the CC reconfiguration message, the UE selects a preamble from the preamble group dedicatedly used during the CC reconfiguration and sends the preamble to the base station, or if the system does not have the preamble group dedicatedly used during the CC reconfiguration, but sets the new random access channel for the CC reconfiguration, the UE randomly selects one from currently available preambles, and sends the preamble to the base station on the new random access channel dedicatedly used during the CC reconfiguration, further, if the system does not set the dedicated preamble and the new random access channel for the CC reconfiguration, when sending the CC reconfiguration message to the UE, the base station may dispatch, in the CC reconfiguration message, the PUSCH resource used to send the preamble for the UE, and the UE randomly selects one from the currently available preambles, and then sends the selected preamble on the dispatches PUSCH resource in the CC reconfiguration message; after receiving the preamble sent by the UE, the base station sends the TA adjusting command to the UE. The TA adjusting command needs to include the TA value, besides, it further needs to include the identification information of the detected preamble sent by the UE (the identification information may be the identification information in the dedicated preamble group, or the identification information of all the preambles in a current cell), and optionally, the TA adjusting command may include the identification information of the newly configured CCs. The extended TA adjusting command may adopt the extended TA adjusting command described in Embodiment 1 to Embodiment 5.

In this embodiment, when the base station needs to configure a new CC for the UE, or one or multiple CCs currently used by the UE need to be replaced by newly configured CCs, the UE may achieve the uplink synchronization with the newly configured CCs.

Figure 11:
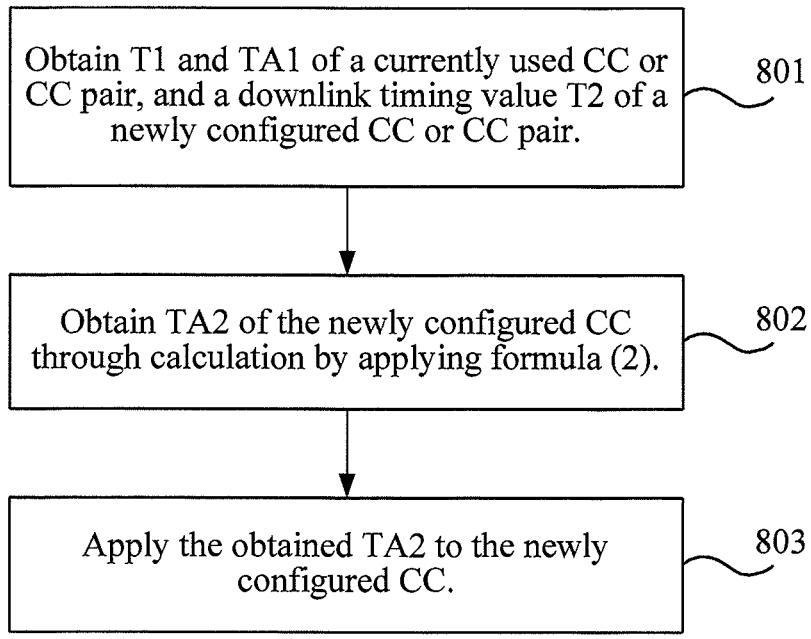
FIG. 11 is a flow chart of Embodiment 10 of an uplink synchronization processing method according to the present invention.

FIG. 11 is a flow chart of Embodiment 10 of an uplink synchronization processing method according to the present invention. As shown in FIG. 11, the method of this embodiment may include the following steps:

Step 801: Obtain a downlink timing value T1 and an uplink TA TA1 of a currently used CC or CC pair, and a downlink timing value T2 of a newly configured CC or CC pair;

Step 802: Obtain an uplink TA2 of the newly configured CC through calculation by applying formula (2), $$TA2=TA1+2\times(T2-T1) \quad (2); \text{ and}$$

Step 803: Apply the obtained TA2 to the newly configured CC.

In this embodiment, the UE may adjust TA situation of the newly configured CC according to the TA value of the already configured CC, no matter whether multiple CCs share the TA, the UE may calculate the uplink TA of the newly configured CC according to the downlink TA and the uplink TA of the already configured CC and the downlink timing value of the newly configured CC. It should be understood that this embodiment may be combined with the methods of other embodiments, to calculate the TA value of the newly configured CCs. In this embodiment, when the base station needs to configure a new CC for the UE, or one or multiple CCs currently used by the UE need to be replaced by newly configured CCs, the UE may achieve the uplink synchronization with the newly configured CCs.

In the technical solutions of all the embodiments mentioned above, the TA adjustment during the CC reconfiguration is described by taking frequency division duplex as an example, and for time division duplex, because as for a CC, there is no differentiation between an uplink CC and a downlink CC, so that when the CC reconfiguration in any embodiment is directly replaced by the CC reconfiguration under the time division duplex, the methods in all the embodiments are available.

It should be particularly noted that in each embodiment where the uplink synchronization is performed by using the dedicated preamble in the present invention, the method in the following may be used to replace the using of the dedicated preamble, and a specific procedure is as follows.

When knowing that the uplink synchronization needs to be executed on the one or multiple newly configured CCs, the UE randomly selects one or multiple preambles, and sends the preamble to the base station on the one or multiple CCs on which the uplink synchronization needs to be executed. In order to enable the base station to explicitly know the preambles selected by the UE, before sending the preambles or during sending the preambles, the UE reports the identification information of the selected preambles to the base station on the currently used CC, where the UE may report the index of the selected preamble to the base station by using any one of the manners in the following:

1) RRC signaling; 2) MAC control PDU; 3) physical layer signaling; 4) carrying the identification information of the selected Preambles in an uplink user plane data packet.

When the base station detects the preamble reported by the UE on the CC on which the uplink synchronization needs to be executed, the base station may send the TA value to the UE by using the random access response message based on the TA value obtained through the detection of the preamble. However, when the UE sends the same preamble on multiple CCs, the UE needs to indicate multiple TA values in the random access response message, and needs to indicate the identification information of the CCs corresponding to the multiple TA values, that is, the UE is enabled to explicitly know the corresponding relationship between the TA value and the CC. Alternatively, the one or multiple TA values detected by the base station may be sent to the UE by using the extended TA command message or the CC reconfiguration message in each embodiment.

In addition, for a frequency division duplex system, if the base station newly configures an uplink CC for the UE separately, and does not configure a downlink CC corresponding to the uplink CC for the UE, the UE cannot obtain the T2 value. Under the situation, the UE may initiate the uplink synchronization on the uplink CC, that is, may execute the random access procedure on the uplink CC, or may execute the uplink synchronization operation according to the methods of other embodiments of the present invention.

Figure 12:
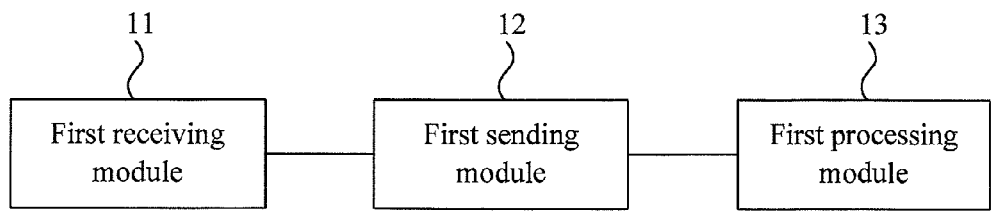
FIG. 12 is a schematic structural diagram of Embodiment 1 of a UE according to the present invention.

FIG. 12 is a schematic structural diagram of Embodiment 1 of a UE according to the present invention. As shown in FIG. 12, the UE of this embodiment may include: a first receiving module 11, a first sending module 12, and a first processing module 13, where the first receiving module 11 is configured to receive an uplink synchronization indication message sent by a base station, the uplink synchronization indication message carries identification information of one or multiple newly configured CCs; the first sending module 12 is configured to send synchronization signaling to the base station when knowing that the uplink synchronization needs to be executed on all or a part of the one or multiple newly configured CCs corresponding to the identification information; and the first processing module 13 is configured to apply a TA value carried in a TA adjusting message to the CC on which the uplink synchronization needs to be executed, after the first receiving module receives the TA adjusting message that is sent by the base station according to the synchronization signaling.

A realizing principle of the UE of this embodiment is the same as that of Embodiment 1 of the uplink synchronization processing method as shown in FIG. 1, and is not described again.

In another embodiment of the UE according to the present invention, if the uplink synchronization indication message received by the first receiving module is a CC reconfiguration message, the first receiving module is further configured to receive an extended TA value adjusting command that is sent by the base station according to the synchronization signaling, and the extended TA value adjusting command includes a TA value that is on the one newly configured CC and requires adjustment, or the extended TA value adjusting command includes one or multiple TA values that are on the multiple newly configured CCs and require adjustment, and the identification information of the CC corresponding to each TA value.

A realizing principle of the UE of this embodiment is the same as that of Embodiment 3 of the uplink synchronization processing method as shown in FIG. 3, and is not described again.

In still another embodiment of the UE according to the present invention, if the uplink synchronization indication message received by the first receiving module is a Physics Downlink Control Channel PDCCH, the first receiving module is further configured to receive an extended TA value adjusting command that is sent by the base station according to the synchronization signaling, and receive a CC reconfiguration message sent by the base station.

A realizing principle of the UE of this embodiment is the same as that of Embodiment 4 of the uplink synchronization processing method as shown in FIG. 5, and is not described again.

In still another embodiment of the UE, if the uplink synchronization indication message received by the first receiving module is a Physics Downlink Control Channel PDCCH, the first receiving module is further configured to receive a CC reconfiguration message that is sent by the base station according to the synchronization signaling, where the CC reconfiguration message includes a TA value that is on the one newly configured CC and requires adjustment, or the CC reconfiguration message includes one or multiple TA values that are on the multiple newly configured CCs and require adjustment, and the identification information of the CC corresponding to each TA value.

A realizing principle of the UE of this embodiment is the same as that of Embodiment 5 of the uplink synchronization processing method as shown in FIG. 6, and is not described again.

In the embodiments of the UE, when knowing, according to the uplink synchronization indication message, that the uplink synchronization does not need to be executed on all or a part of the one or multiple newly configured CCs corresponding to the identification information, the first processing module is further configured to apply an indicated TA value in the uplink synchronization indication message to the newly configured CC on which the uplink synchronization does not need to be executed.

Through the UE of the embodiment, when the base station needs to configure a new CC for the UE, or one or multiple CCs currently used by the UE need to be replaced by newly configured CCs, the UE may achieve the uplink synchronization with the newly configured CCs by using the obtained TA value. Further, during the procedure, the UE is triggered to execute the uplink synchronization only through the uplink synchronization indication message, for example, the CC reconfiguration message or the PDCCH, to save downlink radio resources, and when the UE needs to execute the uplink synchronization, the UE may send synchronization signaling to the base station, for example, a dedicated preamble, to obtain TA values required to be used on the newly configured CCs from the base station, thereby improving an uplink synchronization speed. When the UE knows, according to the received uplink synchronization indication message, that the uplink synchronization does not need to be executed on all or a part of the one or multiple newly configured CCs corresponding to the identification information, the UE may directly apply the TA value indicated in the uplink synchronization indication message to the newly configured CC on which the uplink synchronization does not need to be executed, or the UE may directly apply the unique TA value on the currently used CC to the newly configured CC on which the uplink synchronization does not need to be executed, so that the UE may achieve the uplink synchronization with the newly configured CCs when it does not need to execute the uplink synchronization.

Figure 13:
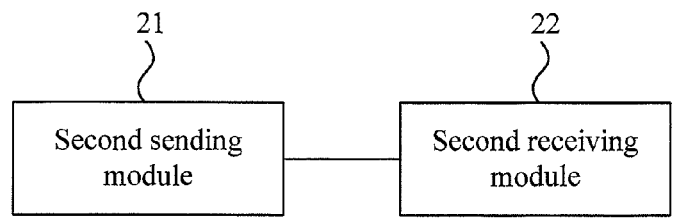
FIG. 13 is a schematic structural diagram of Embodiment 1 of a base station according to the present invention.

FIG. 13 is a schematic structural diagram of Embodiment 1 of a base station according to the present invention. As shown in FIG. 13, the base station of this embodiment may include: a second sending module 21 and a second receiving module 22, where the second sending module 21 is configured to send an uplink synchronization indication message to a UE, and the uplink synchronization indication message carries identification information of one or multiple newly configured CCs; and the second receiving module 22 is configured to receive synchronization signaling sent by the UE, where the second sending module 21 is further configured to send a TA adjusting message to the UE according to the synchronization signaling, to instruct the UE to apply a TA value carried in the TA adjusting message to the CC on which the uplink synchronization needs to be executed.

A realizing principle of the base station of this embodiment is the same as that of Embodiment 1 of the uplink synchronization processing method as shown in FIG. 2, and is not described again.

In another embodiment of the base station according to the present invention, if the uplink synchronization indication message sent by the second sending module to the UE is a CC reconfiguration message, the second sending module is further configured to send an extended TA value adjusting command to the UE, and the extended TA value adjusting command includes a TA value that is on the one newly configured CC and requires adjustment, or the extended TA value adjusting command includes one or multiple TA values that are on the multiple newly configured CCs and requires adjustment, and the identification information of the CC corresponding to each TA value.

A realizing principle of the base station of this embodiment is the same as that of Embodiment 3 of the uplink synchronization processing method as shown in FIG. 3, and is not described again.

In further another embodiment of the UE according to the present invention, if the uplink synchronization indication message sent by the second sending module to the UE is a PDCCH, the second sending module is further configured to send an extended TA value adjusting command and a CC reconfiguration message to the UE.

A realizing principle of the base station of this embodiment is the same as that of Embodiment 4 of the uplink synchronization processing method as shown in FIG. 5, and is not described again.

In still another embodiment of the UE, if the uplink synchronization indication message sent by the second sending module to the UE is a Physics Downlink Control Channel PDCCH, the second sending module is further configured to send an extend TA value adjusting command and a CC reconfiguration message to the UE; or the second sending module is further configured to send a CC reconfiguration message to the UE, where the CC reconfiguration message includes a TA value of the UE, which is on the one newly configured CC and require adjustment, or the CC reconfiguration message includes one or multiple TA values of the UE, which are on the multiple newly configured CCs and require adjustment, and the identification information of the CC corresponding to each TA value.

A realizing principle of the base station of this embodiment is the same as that of Embodiment 5 of the uplink synchronization processing method as shown in FIG. 6, and is not described again.

In the embodiments of the base station, the base station may send the uplink synchronization indication message to the UE, so that when the base station needs to configure a new CC for the UE, or one or multiple CCs currently used by the UE need to be replaced by newly configured CCs, whether the uplink synchronization is required to be executed may be known according to the uplink synchronization indication message, so that the UE may achieve the uplink synchronization with the newly configured CCs. Further, during the procedure, the UE is triggered to execute the uplink synchronization only through the uplink synchronization indication message, to save downlink radio resources, and when the UE needs to execute the uplink synchronization, the UE may send synchronization signaling to the base station, for example, a dedicated preamble, to obtain TA values required to be used on the newly configured CCs from the base station, thereby improving an uplink synchronization speed. When the UE knows, according to the received uplink synchronization indication message, that the uplink synchronization does not need to be executed on all or a part of the one or multiple newly configured CCs corresponding to the identification information, the UE may directly apply the TA value indicated in the uplink synchronization indication message to the newly configured CC on which the uplink synchronization does not need to be executed, or the UE may directly apply the unique TA value on the currently used CC to the newly configured CC on which the uplink synchronization does not need to be executed, so that the UE may achieve the uplink synchronization with the newly configured CCs when it does not need to execute the uplink synchronization.

Figure 14:
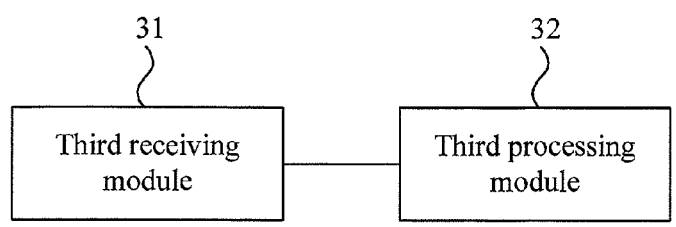
FIG. 14 is a schematic structural diagram of Embodiment 2 of a UE according to the present invention.

FIG. 14 is a schematic structural diagram of Embodiment 2 of a UE according to the present invention. As shown in FIG. 14, the UE of this embodiment may include: a third receiving module 31 and a third processing module 32, where the third receiving module 31 is configured to receive an uplink synchronization indication message sent by a base station, the uplink synchronization indication message carries identification information of one or multiple newly configured CCs; and the third processing module 32 is configured to execute uplink synchronization on the one or multiple newly configured CCs when knowing, according to the identification information of the CCs, that the one or multiple newly configured CCs and a currently used CC do not belong to the same CC group, where the CC group is formed by one or multiple CCs sharing the same TA value.

Further, before receiving the uplink synchronization indication message sent by the base station, the third receiving module 31 is further configured to receive CC group information sent by the base station in a broadcasting manner or through dedicated signaling, where the CC group information is used to instruct CCs in the same CC group to share a TA value.

A realizing principle of the base station of this embodiment is the same as that of Embodiment 6 of the uplink synchronization processing method as shown in FIG. 7, and is not described again.

Through the UE of this embodiment, when a CC group exists, the UE may know, according to the CC group information and the newly configured identification information, whether the newly configured CCs belong to a certain CC group, and when the newly configured CCs belong to the certain CC group, the UE realizes the uplink synchronization by directly using the TA corresponding to the CC group, and when the newly configured CCs do not belong to the certain CC group, the UE initiates the uplink synchronization operation to the base station, to obtain the TA value used on the newly configured CCs from the base station. Therefore, when the base station needs to configure a new CC for the UE, or one or multiple CCs currently used by the UE need to be replaced by newly configured CCs, the UE may achieve the uplink synchronization with the newly configured CCs.

Figure 15:
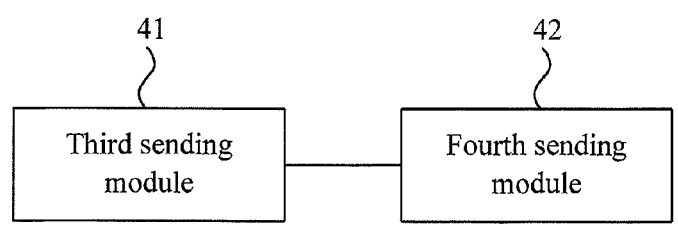
FIG. 15 is a schematic structural diagram of Embodiment 2 of a base station according to the present invention.

FIG. 15 is a schematic structural diagram of Embodiment 2 of a base station according to the present invention. As shown in FIG. 15, the base station of this embodiment may include: a third sending module 41 and a fourth sending module 42, where the third sending module 41 is configured to send CC group information to a UE in a broadcasting manner or through dedicated signaling, and the CC group information is used to instruct CCs in the same CC group to share a TA value; and the fourth sending module 42 is configured to send an uplink synchronization indication message to the UE, and the uplink synchronization indication message carries identification information of one or multiple newly configured CCs, so that when knowing, according to the identification information of the CCs, that the one or multiple newly configured CCs and a currently used CC do not belong to the same CC group, the UE executes uplink synchronization on the one or multiple newly configured CCs.

A realizing principle of the base station of this embodiment is the same as that of Embodiment 7 of the uplink synchronization processing method as shown in FIG. 8, and is not described again.

Through the base station of this embodiment, when a CC group exists, the UE may know, according to the CC group information and the newly configured identification information, whether the newly configured CCs belong to the certain CC group, when the newly configured CCs belong to the certain CC group, the UE realizes the uplink synchronization by directly using the TA corresponding to the CC group, and when the newly configured CCs do not belong to the certain CC group, the UE initiates the uplink synchronization operation to the base station, to obtain the TA value used on the newly configured CCs from the base station. Therefore, when the base station of this embodiment needs to configure a new CC for the UE, or one or multiple CCs currently used by the UE need to be replaced by newly configured CCs, the UE may achieve the uplink synchronization with the newly configured CCs.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications may be made to the technical solutions described in the foregoing embodiments, or equivalent replacements may be made to some technical features in the technical solutions, as long as such modifications or replacements do not cause the essence of corresponding technical solutions to depart from the idea and protection scope of the present invention.

What is claimed is:

1. An uplink synchronization processing method, comprising:
    receiving an uplink synchronization indication message sent by a base station, wherein the uplink synchronization indication message carries identification information of one or multiple newly configured component carriers CCs;
    sending synchronization signaling to the base station when knowing that uplink synchronization needs to be executed on all or a part of the one or multiple newly configured CCs corresponding to the identification information; and
    receiving a time advanced TA adjusting message that is sent by the base station according to the synchronization signaling, and applying a TA value carried in the TA adjusting message to a CC on which the uplink synchronization needs to be executed.

2. The uplink synchronization processing method according to claim 1, wherein the uplink synchronization indication message is a CC reconfiguration message, and the receiving the TA adjusting message that is sent by the base station according to the synchronization signaling comprises:
    receiving an extended TA value adjusting command that is sent by the base station according to the synchronization signaling, wherein the extended TA value adjusting command comprises a TA value which needs to be adjusted on the one newly configured CC.

3. The uplink synchronization processing method according to claim 1, wherein the uplink synchronization indication message is a CC reconfiguration message, and the receiving the TA adjusting message that is sent by the base station according to the synchronization signaling comprises:
    receiving an extended TA value adjusting command that is sent by the base station according to the synchronization signaling, wherein the extended TA value adjusting command comprises one or multiple TA values which needs to be adjusted on the multiple newly configured CCs and identification information of a CC corresponding to each TA value.

4. The uplink synchronization processing method according to claim 1, wherein if the uplink synchronization indication message is a physics downlink control channel PDCCH,
    the receiving the TA adjusting message that is sent by the base station according to the synchronization signaling comprises:
    receiving an extended TA value adjusting command that is sent by the base station according to the synchronization signaling, wherein the extended TA value adjusting command comprises a TA value which needs to be adjusted on the one newly configured CC.

5. The uplink synchronization processing method according to claim 1, wherein if the uplink synchronization indication message is a physics downlink control channel PDCCH,
    the receiving the TA adjusting message that is sent by the base station according to the synchronization signaling comprises:

receiving a CC reconfiguration message sent by the base station according to the synchronization signaling, wherein the CC reconfiguration message comprises a TA value which needs to be adjusted on the one newly configured CC.

6. The uplink synchronization processing method according to claim 1, wherein if the uplink synchronization indication message is a physics downlink control channel PDCCH,
the receiving the TA adjusting message that is sent by the base station according to the synchronization signaling comprises:
receiving a CC reconfiguration message sent by the base station according to the synchronization signaling, wherein the CC reconfiguration message comprises one or multiple TA values which needs to be adjusted on the multiple newly configured CCs and the identification information of the CC corresponding to each TA value.

7. The uplink synchronization processing method according to claim 1, wherein the knowing that the uplink synchronization needs to be executed on all or a part of the one or multiple newly configured CCs corresponding to the identification information comprises:
knowing that the uplink synchronization needs to be executed on all or a part of the one or multiple newly configured CCs, according to bit indication information in the uplink synchronization indication message, wherein the bit indication information is used to indicate whether the uplink synchronization needs to be executed on all or a part of the one or multiple newly configured CCs.

8. The uplink synchronization processing method according to claim 1, wherein the knowing that the uplink synchronization needs to be executed on all or a part of the one or multiple newly configured CCs corresponding to the identification information comprises:
knowing that the uplink synchronization needs to be executed on the all or a part of the one or multiple newly configured CCs, according to distribution information of the synchronization signaling in the uplink synchronization indication message.

9. The uplink synchronization processing method according to claim 1, further comprising:
applying an indicated TA value in the uplink synchronization indication message to a newly configured CC when knowing, according to the uplink synchronization indication message, that the uplink synchronization does not need to be executed on all or a part of the one or multiple newly configured CCs.

10. The uplink synchronization processing method according to claim 1, further comprising:
applying a unique TA value of a currently used CC to all or a part of CCs on which the uplink synchronization does not need to be executed on the one or multiple newly configured CCs when knowing, according to the uplink synchronization indication message, that the uplink synchronization does not need to be executed on all or a part of the one or multiple newly configured CCs.

11. An uplink synchronization processing method, comprising:
sending an uplink synchronization indication message to a User Equipment UE, wherein the uplink synchronization indication message carries identification information of one or multiple newly configured component carriers CCs;
receiving synchronization signaling sent by the UE;
sending a time advanced TA adjusting message to the UE according to the synchronization signaling, to instruct the UE to apply a TA value carried in the TA adjusting message to a CC on which the uplink synchronization needs to be executed.

12. The uplink synchronization processing method according to claim 11, wherein if the uplink synchronization indication message sent to the UE is a CC reconfiguration message, the sending the TA adjusting message to the UE comprises:
sending an extended TA value adjusting command to the UE, wherein the extended TA value adjusting command comprises a TA value of the UE, which is on one newly configured CC and requires adjustment.

13. The uplink synchronization processing method according to claim 11, wherein if the uplink synchronization indication message sent to the UE is a CC reconfiguration message, the sending the TA adjusting message to the UE comprises:
sending an extended TA value adjusting command to the UE, wherein the extended TA value adjusting command comprises one or multiple TA values of the UE, which are on the multiple newly configured CCs and require adjustment, and identification information of a CC corresponding to each TA value.

14. A User Equipment UE, comprising:
a first receiving module, configured to receive an uplink synchronization indication message sent by a base station, wherein the uplink synchronization indication message carries identification information of one or multiple newly configured component carriers CCs;
a first sending module, configured to send synchronization signaling to the base station when knowing that uplink synchronization needs to be executed on all or a part of the one or multiple newly configured CCs corresponding to the identification information; and
a first processing module, configured to apply a time advanced TA value carried in a TA adjusting message to a CC on which the uplink synchronization needs to be executed, after the first receiving module receives the TA adjusting message that is sent by the base station according to the synchronization signaling.

15. The UE according to claim 14, wherein if the uplink synchronization indication message received by the first receiving module is a CC reconfiguration message, the first receiving module is further configured to receive an extended TA value adjusting command that is sent by the base station according to the synchronization signaling, wherein the extended TA value adjusting command comprises a TA value which is on the one newly configured CC and requires adjustment, or the extended TA value adjusting command comprises one or multiple TA values which are on the multiple newly configured CCs and require adjustment, and the identification information of the CC corresponding to each TA value;
if the uplink synchronization indication message received by the first receiving module is a physics downlink control channel PDCCH, the first receiving module is further configured to receive an extended TA value adjusting command that is sent by the base station according to the synchronization signaling, and receive a CC reconfiguration message sent by the base station, or the first receiving module is further configured to receive a CC reconfiguration message that is sent by the base station according to the synchronization signaling, and the CC reconfiguration message comprises a TA value which is on the one newly configured CC and requires adjustment, or the CC reconfiguration message comprises one or multiple TA values which are on the multiple newly configured CCs and require adjustment, and the identification information of the CC corresponding to each TA value.

16. A base station, comprising:
a second sending module, configured to send an uplink synchronization indication message to a User Equipment UE, wherein the uplink synchronization indication message carries identification information of one or multiple newly configured component carriers CCs; and
a second receiving module, configured to receive synchronization signaling sent by the UE,
wherein the second sending module is further configured to send a time advanced TA adjusting message to the UE according to the synchronization signaling, to instruct the UE to apply a TA value carried in the TA adjusting message to a CC on which the uplink synchronization needs to be executed.

17. The base station according to claim 16, wherein if the uplink synchronization indication message sent by the second sending module to the UE is a CC reconfiguration message, the second sending module is further configured to send an extended TA value adjusting command to the UE, the extended TA value adjusting command comprises a TA value of the UE, which is on the one newly configured CC and requires adjustment, or the extended TA value adjusting command comprises one or multiple TA values of the UE, which are on the multiple newly configured CCs and require adjustment, and the identification information of a CC corresponding to each TA value;
if the uplink synchronization indication message sent by the second sending module is a physics downlink control channel PDCCH, the second sending module is further configured to send an extended TA value adjusting command to the UE, or the second sending module is further configured to send a CC reconfiguration message to the UE, and the CC reconfiguration message comprises a TA value of the UE, which is on the one newly configured CC and requires adjustment, or the CC reconfiguration message comprises one or multiple TA values of the UE, which are on the multiple newly configured CCs and require adjustment, and the identification information of the CC corresponding to each TA value.

* * * * *